US012477287B2

(12) United States Patent
Vardfjäll et al.

(10) Patent No.: US 12,477,287 B2
(45) Date of Patent: Nov. 18, 2025

(54) MICROPHONE PLACEMENT

(71) Applicant: Cochlear Limited, Macquarie University (AU)

(72) Inventors: Marcus Vardfjäll, Mölnlycke (SE); Henrik Fyrlund, Mölnlycke (SE); Kristian Asnes, Mölnlycke (SE); Clas Johansson, Mölnlycke (SE)

(73) Assignee: Cochlear Limited, Macquarie University (AU)

( * ) Notice: Subject to any disclaimer, the term of this patent is extended or adjusted under 35 U.S.C. 154(b) by 0 days.

(21) Appl. No.: 18/400,896

(22) Filed: Dec. 29, 2023

(65) Prior Publication Data

US 2024/0137716 A1 Apr. 25, 2024

Related U.S. Application Data

(63) Continuation of application No. 17/202,898, filed on Mar. 16, 2021, now Pat. No. 11,863,940, which is a continuation of application No. 15/493,827, filed on Apr. 21, 2017, now Pat. No. 10,972,846.

(60) Provisional application No. 62/326,238, filed on Apr. 22, 2016.

(51) Int. Cl.
*H04R 25/00* (2006.01)

(52) U.S. Cl.
CPC ......... *H04R 25/606* (2013.01); *H04R 25/556* (2013.01); *H04R 25/602* (2013.01); *H04R 25/607* (2019.05); *H04R 2225/021* (2013.01); *H04R 2225/0213* (2019.05); *H04R 2460/13* (2013.01)

(58) Field of Classification Search
CPC .. H04R 25/606; H04R 25/556; H04R 25/602; H04R 25/607; H04R 225/0213; H04R 225/021; H04R 2460/13
See application file for complete search history.

(56) References Cited

U.S. PATENT DOCUMENTS 6,643,378 B2 11/2003 Schumaier
7,376,237 B2 5/2008 Westerkull
7,599,508 B1 10/2009 Lynch et al.
8,107,661 B1 * 1/2012 Lynch .................... H04R 25/00 381/326

(Continued)

FOREIGN PATENT DOCUMENTS

AU 2002237841 B2 3/2005
CA 2438969 A1 9/2002

(Continued)

OTHER PUBLICATIONS

International Search Report and Written Opinion for PCT/IB2017/052323, mailed Jul. 18, 2017.

(Continued)

*Primary Examiner* — Sunita Joshi
(74) *Attorney, Agent, or Firm* — Pilloff Passino & Cosenza LLP; Martin J. Cosenza

(57) ABSTRACT

A device including a prosthesis configured with a sound capture system and configured to evoke a hearing percept based on a captured sound captured by the sound capture system, wherein at least a portion of the prosthesis is configured to attach to a head of a recipient such that sound is captured by the sound capture system externally of the recipient at a location below an ear canal of a human.

33 Claims, 33 Drawing Sheets

(56) References Cited

U.S. PATENT DOCUMENTS

| | | | |
|---|---|---|---|
| 8,150,084 | B2 | 4/2012 | Jessen et al. |
| 2002/0183014 | A1 | 12/2002 | Takeda et al. |
| 2003/0114834 | A1 | 6/2003 | Mezzoli |
| 2004/0197002 | A1 | 10/2004 | Atsumi et al. |
| 2007/0173683 | A1 | 7/2007 | Harrison et al. |
| 2008/0107289 | A1 | 5/2008 | Retchin et al. |
| 2009/0092271 | A1 | 4/2009 | Fay et al. |
| 2009/0185699 | A1 | 7/2009 | Kim |
| 2009/0226020 | A1 | 9/2009 | Abolfathi et al. |
| 2009/0292161 | A1 | 11/2009 | Parker |
| 2011/0301729 | A1 | 12/2011 | Heiman et al. |
| 2012/0215056 | A1 | 8/2012 | Hillbratt et al. |
| 2012/0302822 | A1 | 11/2012 | Van Himbeeck et al. |
| 2013/0089229 | A1 | 4/2013 | Kristo et al. |
| 2013/0216078 | A1 | 8/2013 | Bewley |
| 2014/0064531 | A1* | 3/2014 | Andersson ........... H04R 25/606 381/326 |
| 2014/0268016 | A1 | 9/2014 | Chow et al. |
| 2014/0316190 | A1 | 10/2014 | Conn et al. |
| 2015/0051667 | A1 | 2/2015 | Van Der Borght et al. |
| 2015/0092970 | A1 | 4/2015 | Klem |
| 2015/0110319 | A1 | 4/2015 | Mimbs |
| 2017/0311099 | A1 | 10/2017 | Vardfjäll et al. |

FOREIGN PATENT DOCUMENTS

| | | | |
|---|---|---|---|
| JP | 2010192975 | A | 9/2010 |
| JP | 2011087142 | A | 4/2011 |
| WO | 2007133055 | A1 | 11/2007 |
| WO | 2009101622 | A2 | 8/2009 |
| WO | 2010138911 | A1 | 12/2010 |
| WO | 2013/054293 | A1 | 4/2013 |
| WO | 2015024581 | A1 | 2/2015 |

OTHER PUBLICATIONS

Extended European Search Report for European Patent Application No. 17 785 554.1.

Summons to Attend Oral Proceedings in Europe Application No. 17 785 554.1, mailed Oct. 7, 2024.

* cited by examiner

MICROPHONE PLACEMENT

CROSS-REFERENCE TO RELATED APPLICATIONS

This application is a Continuation of U.S. patent application Ser. No. 17/202,898, filed Mar. 16, 2021, which is a Continuation of U.S. patent application Ser. No. 15/493,827, filed Apr. 21, 2017, now U.S. Pat. No. 10,972,846, which claims priority to Provisional U.S. Patent Application No. 62/326,238, entitled MICROPHONE PLACEMENT, filed on Apr. 22, 2016, naming Henrik FYRLUND of Molnlycke, Sweden as an inventor, the entire contents of that application being incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses a component positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, certain types of hearing prostheses, commonly referred to as bone conduction devices, convert a received sound into mechanical vibrations. The vibrations are transferred through the skull to the cochlea causing generation of nerve impulses, which result in the perception of the received sound. Bone conduction devices may be a suitable alternative for individuals who cannot derive sufficient benefit from acoustic hearing aids.

SUMMARY

In an exemplary embodiment, there is a device, comprising a prosthesis configured with a sound capture system and configured to evoke a hearing percept based on a captured sound captured by the sound capture system, wherein at least a portion of the prosthesis is configured to attach to a head of a recipient such that sound is captured by the sound capture system externally of the recipient at a location below an ear canal of a human.

In another exemplary embodiment, there is a hearing prosthesis, comprising a behind the ear (BTE) device including a microphone, wherein the BTE device is configured to be secured behind the pinna of a human, and the hearing prosthesis is configured such that the microphone is located at least one of: at a lower portion of the BTE device when the BTE device is secured behind the pinna; or below the ear canal when the BTE device is secured behind the pinna.

In another exemplary embodiment, there is a method, comprising capturing sound at an exterior location of a recipient of a hearing prosthesis at a location corresponding to at least one of a lower pinna location of the recipient, or outside an area over a mastoid bone of the recipient, and evoking a hearing percept based on the captured sound.

In another exemplary embodiment, there is a method, comprising, capturing sound with a sound capture device, evoking a hearing percept utilizing the captured sound, wherein the sound is captured using an upside down behind-the-ear (BTE) device.

BRIEF DESCRIPTION OF THE DRAWINGS

Embodiments of the present invention are described below with reference to the attached drawings, in which.

DETAILED DESCRIPTION

Figure 1:
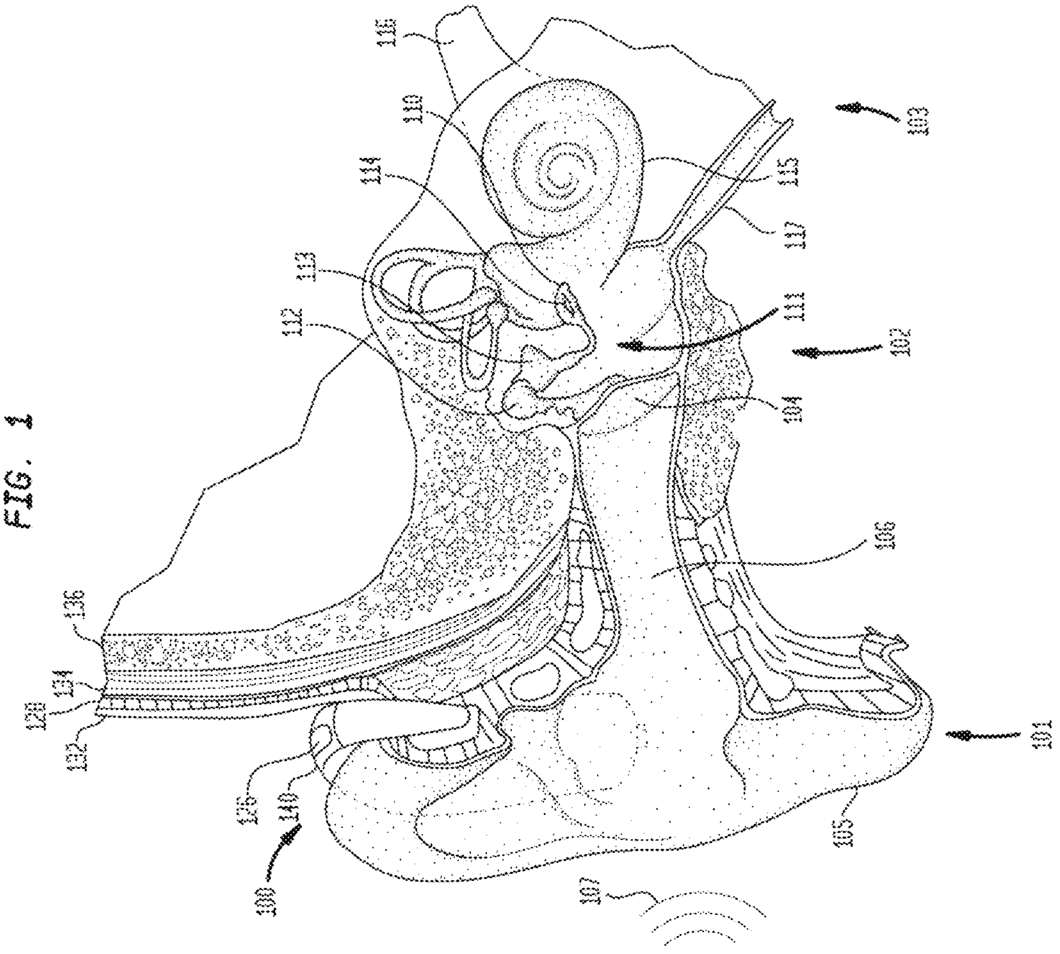
FIG. 1 is a perspective view of an exemplary bone conduction device in which embodiments of the present invention can be implemented.

FIG. 1 is a perspective view of a passive transcutaneous bone conduction device 100 in which embodiments of the present invention can be implemented, worn by a recipient. As shown, the recipient has an outer ear 101, a middle ear 102, and an inner ear 103. Elements of outer ear 101, middle ear 102, and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 110 through three bones of middle ear 102, collectively referred to as the ossicles 111 and comprising the malleus 112, the incus 113, and the stapes 114. The ossicles 111 of middle ear 102 serve to filter and amplify acoustic wave 107, causing oval window 110 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1 also illustrates the positioning of bone conduction device 100 relative to outer ear 101, middle ear 102, and inner ear 103 of a recipient of device 100. As shown, bone conduction device 100 is positioned behind outer ear 101 of the recipient. Bone conduction device 100 comprises an external component 140 in the form of a behind-the-ear (BTE) device.

External component 140 typically comprises one or more sound input elements 126, such as microphone, for detecting and capturing sound, a sound processing unit/sound processor (not shown) and a power source (not shown). The external component 140 includes an actuator (not shown), which in the embodiment of FIG. 1, is located within the body of the BTE device, although in other embodiments, the actuator can be located remote from the BTE device (or other components of the external component 140 having a sound input element, a sound processing unit and/or a power source, etc.).

It is noted that sound input element 126 can comprise, for example, devices other than a microphone, such as, for example, a telecoil, etc. In an exemplary embodiment, sound input element 126 can be located remote from the BTE device and can take the form of a microphone or the like located on a cable or can take the form of a tube extending from the BTE device, etc. Alternatively, sound input element 126 can be subcutaneously implanted in the recipient, or positioned in the recipient's ear. Sound input element 126 can also be a component that receives an electronic signal indicative of sound, such as, for example, from an external audio device. For example, sound input element 126 can receive a sound signal in the form of an electrical signal from an MP3 player electronically connected to sound input element 126.

The sound processing unit/sound processor of the external component 140 processes the output of the sound input element 126, which is typically in the form of an electrical signal. The processing unit generates control signals that cause the actuator to vibrate. In other words, the actuator converts the electrical signals into mechanical vibrations for delivery to the recipient's skull.

As noted above, with respect to the embodiment of FIG. 1, bone conduction device 100 is a passive transcutaneous bone conduction device. That is, no active components, such as the actuator, are implanted beneath the recipient's skin 132. In such an arrangement, as will be described below, the active actuator is located in external component 140.

The embodiment of FIG. 1 is depicted as having no implantable component. That is, vibrations generated by the actuator are transferred from the actuator, into the skin directly from the actuator and/or through a housing of the BTE device, through the skin of the recipient, and into the bone of the recipient, thereby evoking a hearing percept without passing through an implantable component. In this regard, it is a totally external or non-surgical bone conduction device. Alternatively, in an exemplary embodiment, there is an implantable component that includes a plate or other applicable component, as will be discussed in greater detail below. The plate or other component of the implantable component vibrates in response to vibration transmitted through the skin.

Figure 2A:
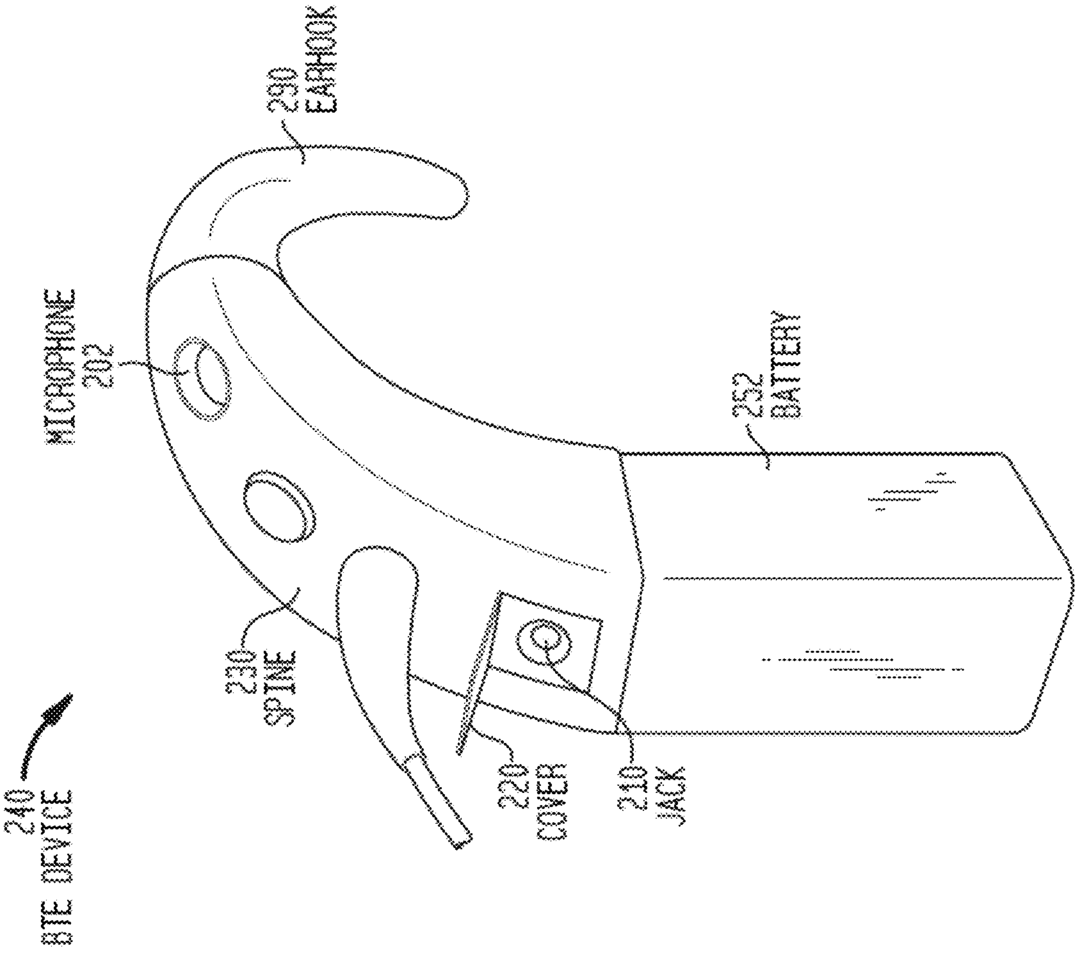
FIG. 2A is a perspective view of a Behind-The-Ear (BTE) device according to an exemplary embodiment.

FIG. 2A is a perspective view of a BTE device 240 of a hearing prosthesis, which, in this exemplary embodiment, corresponds to the BTE device (external component 140) detailed above with respect to FIG. 1. BTE device 240 includes one or more microphones 202, and may further include an audio signal jack 210 under a cover 220 on the spine 230 of BTE device 240. It is noted that in some other embodiments, one or both of these components (microphone 202 and/or jack 210) may be located on other positions of the BTE device 240, such as, for example, the side of the spine 230 (as opposed to the back of the spine 230, as depicted in FIG. 2), the ear hook 290, etc. FIG. 2A further depicts battery 252 and ear hook 290 removably attached to spine 230.

Figure 2B:
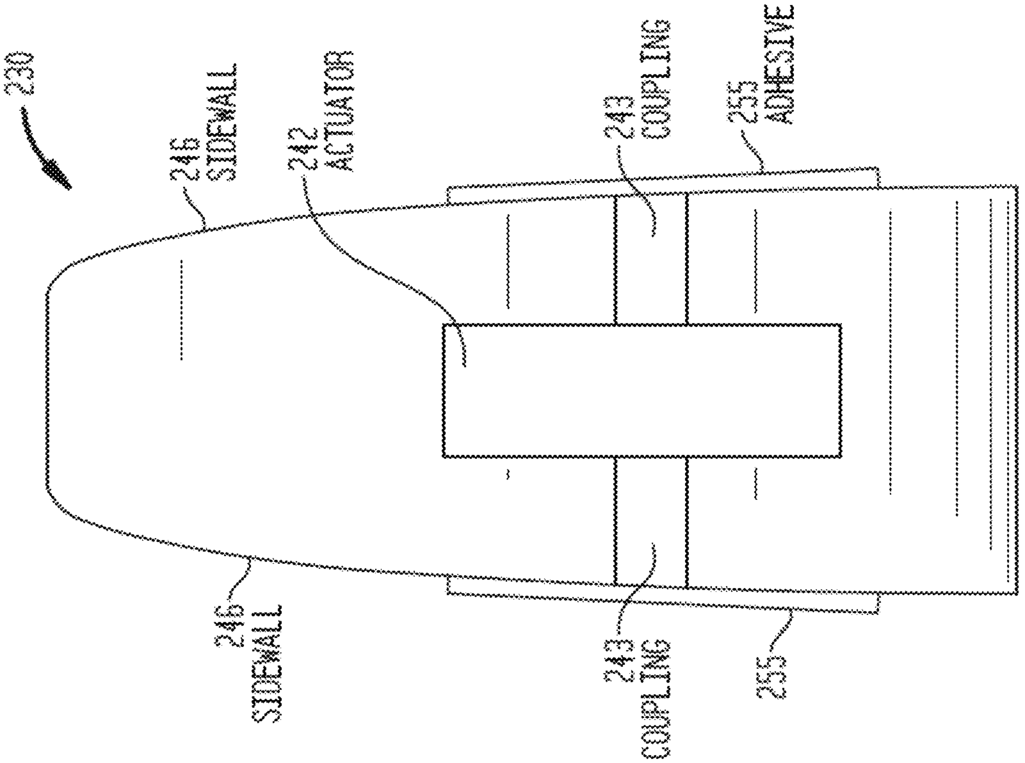
FIG. 2B is a cross-sectional view of a spine of the BTE device of FIG. 2A.

FIG. 2B is a cross-sectional view of an exemplary spine 230 of BTE device 240 of FIG. 2A. Actuator 242 is shown located within the spine 230 of BTE device 242. Actuator 242 is a vibrator actuator, and is coupled to the sidewalls 246 of the spine 230 via couplings 243 which are configured to transfer vibrations generated by actuator 242 to the sidewalls 246, from which those vibrations are transferred to skin 132. In an exemplary embodiment, couplings 543 are rigid structures having utilitarian vibrational transfer characteristics. The sidewalls 246 form at least part of a housing of spine 230. In some embodiments, the housing hermetically seals the interior of the spine 230 from the external environment.

In the embodiment of FIGS. 2A and 2B, the BTE device 240 forms a self-contained transcutaneous bone conduction device. It is a passive transcutaneous bone conduction device in that the actuator 242 is located external to the recipient.

FIG. 2B depicts adhesives 255 located on the sidewalls 246 of the BTE device 240. As will be detailed below, adhesives 255 form coupling portions that are respectively configured to removably adhere the BTE device 240 to the recipient via adhesion at the locations of the adhesives 255. This adherence being in addition to that which might be provided by the presence of the ear hook 290 and/or any grasping phenomenon resulting from the auricle 105 of the outer ear and the skin overlying the mastoid bone of the recipient. Accordingly, in an exemplary embodiment, there is an external component, such as a BTE device, that includes a coupling portion that includes a surface configured to directly contact the outer skin. This coupling portion is configured to removably attach the external component to an outer surface of skin of the recipient via attraction of the contact surface to the respective contact portion of the outer skin.

It is noted that the embodiment of FIG. 2B is depicted with adhesives 255 located on both sides of the BTE device. In an exemplary embodiment of this embodiment, this permits the adherence properties detailed herein, and/or variations thereof, to be achieved regardless of whether the recipient wears the BTE device on the right side (in accordance with that depicted in FIG. 1) or the left side (or wears two BTE devices). In an alternate embodiment, BTE device 240 includes adhesive only on one side (the side appropriate for the side on which the recipient intends to wear the BTE device 240). An embodiment of a BTE device includes a dual-side compatible BTE bone conduction device, as will be detailed below.

The adhesives 255 are depicted in FIG. 2B in an exaggerated manner so as to be more easily identified. In an exemplary embodiment, the adhesives 255 are double sided tape, where one side of the tape is protected by a barrier, such as a silicone paper, that is removed from the skin-side of the double-sided tape in relatively close temporal proximity to the placement of the BTE device 240 on the recipient. In an exemplary embodiment, adhesives 255 are glue or the like. In an exemplary embodiment where the adhesives 255 are glue, the glue can be applied in relatively close temporal proximity to the placement of the BTE device 240 on the recipient. Such application can be applied by the recipient to the spine 230, in an exemplary embodiment.

In an alternate embodiment, the adhesives 255 are of a configuration where the adhesive has relatively minimal adhesive properties during a temporal period when exposed to some conditions, and has relatively effective adhesive properties during a temporal period, such as a latter temporal period, when exposed to other conditions. Such a configuration can provide the recipient control over the adhesive properties of the adhesives.

By way of example, the glue and/or tape (double-sided or otherwise) may be a substance that obtains relatively effective adhesive properties when exposed to oil(s) and/or sweat produced by skin, when exposed to a certain amount of pressure, when exposed to body heat, etc., and/or a combination thereof and/or any other phenomena that may enable the teachings detailed herein and/or variations thereof to be practiced. Such exemplary phenomena may be, for example, heat generated via friction resulting from the recipient rubbing his or her finger across the glue. In an exemplary embodiment, the pressure can be a pressure above that which may be expected to be experienced during normal handling of the spine 230.

In an exemplary embodiment, the adhesives 255 are contained in respective containers that exude glue or the like when exposed to certain conditions, such as by way of example and not by way of limitation, the aforementioned conditions. Alternatively, and/or in addition to this, the recipient may puncture or otherwise open the containers to exude the glue or the like.

Any device, system, and/or method that will enable a recipient to practice the teachings detailed herein and/or variations thereof associated with the adherence of the bone conduction device to skin of the recipient for vibration transmission can be utilized in some embodiments.

In an exemplary embodiment, the vibrator actuator 242 is a device that converts electrical signals into vibration. In operation, sound input element 202 converts sound into electrical signals. Specifically, these signals are provided to vibrator actuator 242, or to a sound processor (not shown) that processes the electrical signals, and then provides those processed signals to vibrator actuator 242. The vibrator actuator 242 converts the electrical signals (processed or unprocessed) into vibrations. Because vibrator actuator 242 is mechanically coupled to sidewalls 246, the vibrations are transferred from the vibrator actuator 342 to skin 132 of the recipient.

Figure 2C:
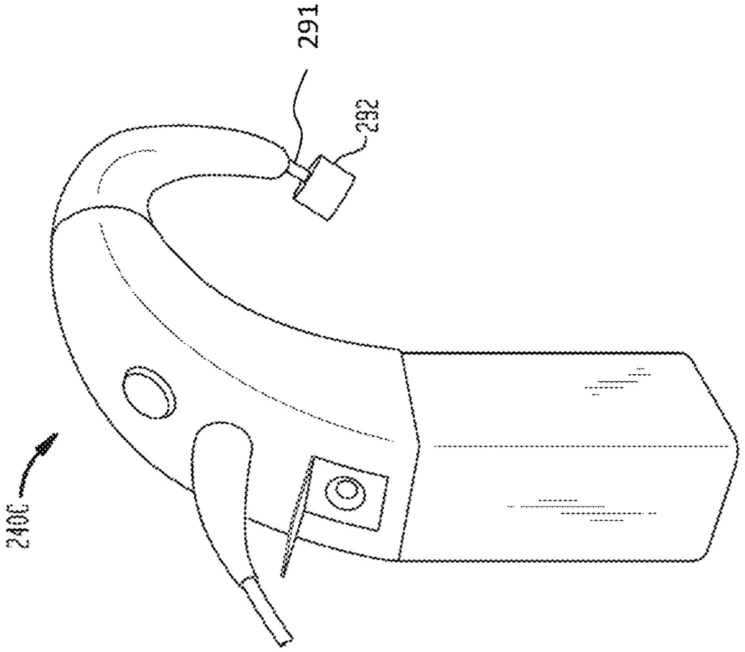
FIG. 2C is a perspective view of an alternate embodiment of a BTE device.

FIG. 2A depicts the sound input element 202 as being located at about the apex of spine 230. FIG. 2C depicts an alternate embodiment of a BTE device 240C in which the sound input element 292 is mounted on a stem 291 extending from the ear hook 290. In an exemplary embodiment, the stem 291 is such that during normal use, the sound input element 292 is located below the ear, in the area of the auricular concha, or in the ear canal. Such a configuration can have utilitarian value by way of reducing feedback as compared to that which may result from the embodiment of FIG. 2A.

Figure 3A:
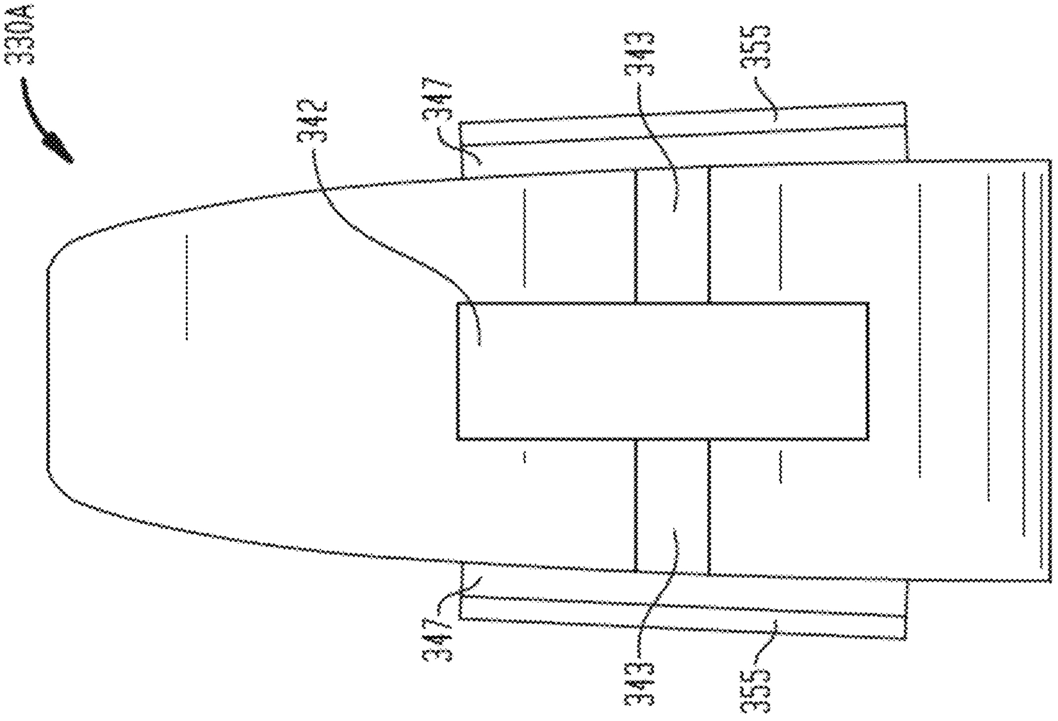
FIG. 3A is a cross-sectional view of a spine of the BTE device according to an alternate embodiment.

It is noted that while the embodiments depicted in FIGS. 2A and 2B detail the vibrations being transferred from the vibrator actuator 242 to the sidewalls 246 via the couplings 243, in other embodiments, the vibrations are transferred to plates or other devices that are located outside of the sidewalls 246. FIG. 3A depicts such an exemplary embodiment, where spine 330A includes couplings 343 extending through sidewalls 346 to plates 347, on which adhesives 255 are located.

Figure 3B:
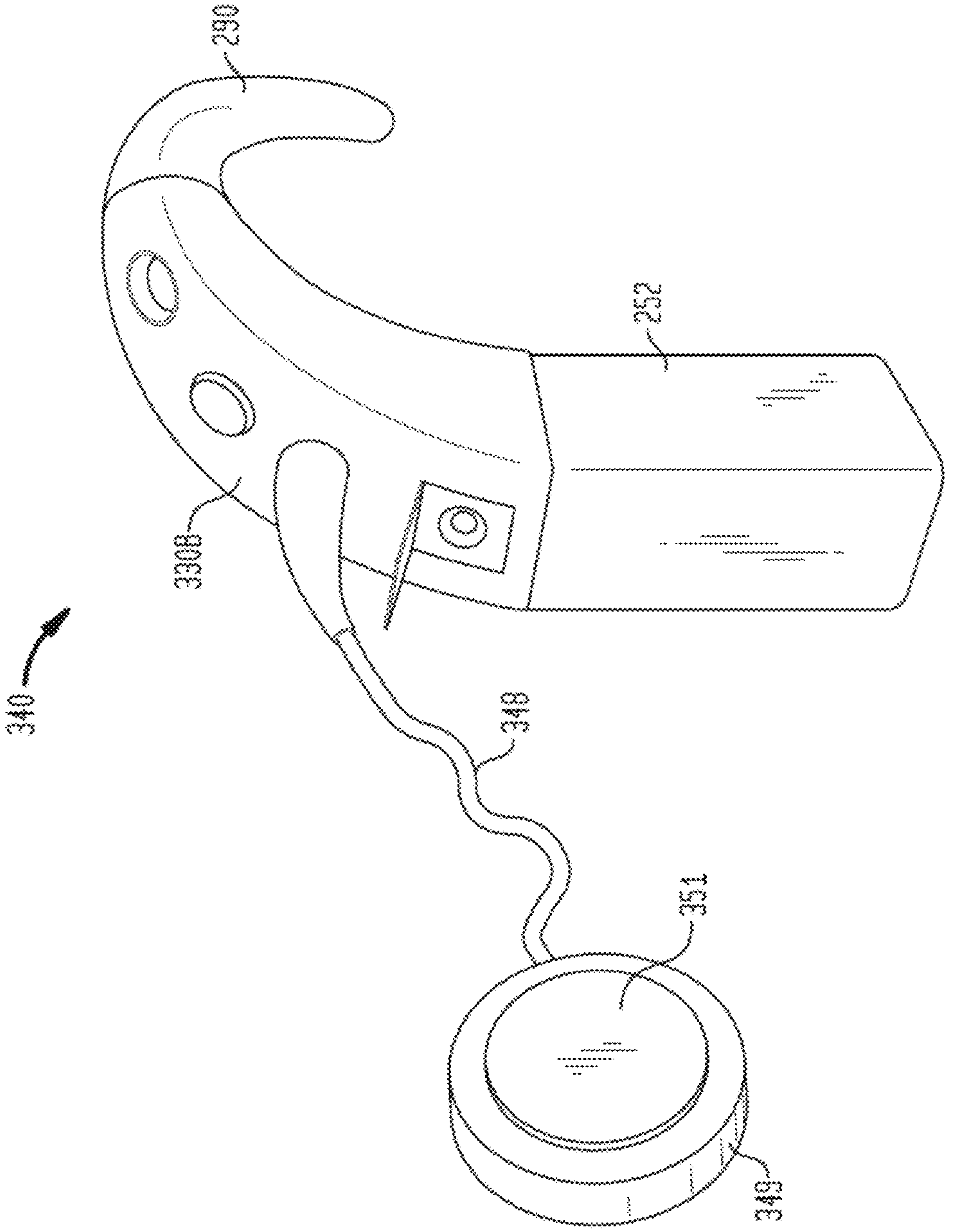
FIG. 3B is a perspective view of an alternate embodiment of an external device including a BTE device.

FIG. 3B depicts an alternate embodiment of an external component of a bone conduction device, BTE device 340, in which the vibrator actuator (such as actuator 242 detailed above, or a variation thereof) is located in a remote vibrator actuator unit 349 (sometimes referred to as a "button" in the art). This as opposed to the spine 330B. Vibrator actuator unit 349 is in electronic communication with spine 330B via cable 348. Spine 330B functionally corresponds to the spines detailed above, with the exception of the features associated with containing a vibrator actuator therein. In this regard, electrical signals are transferred to the vibrator actuator in vibrator actuator unit 349, these signals being, in some embodiments, the same as those which are provided to the other vibrator actuators detailed herein. Vibrator actuator unit 349 may include a coupling 351 to removably attach the unit 349 to outer skin of the recipient. Coupling 351 can correspond to the couplings detailed herein. Such a coupling may include, for example, adhesive. Alternatively, and/or in addition to this, coupling 351 can correspond to a magnet that couples via magnetic attraction to an implanted magnet within the recipient (e.g., an implanted magnet attached to the mastoid bone of the recipient underneath the skin of the recipient).

Such a configuration as that of BTE device 340, can have utilitarian value by way of reducing feedback as compared to that which may result from the embodiment of FIG. 2A.

While the embodiment depicted in FIG. 3B utilizes a cable 348 to communicate with the remote vibrator actuator unit 349, in an alternative embodiment, a wireless link is utilized to communicate between the spine 330B and the remote vibrator actuator unit 349.

In at least some exemplary embodiments, the remote vibrator actuator unit 349 can contain a sound processor/sound processing unit or the like as opposed to, and/or in addition to, the spine 330B. Accordingly, in an exemplary embodiment, the remote vibrator actuator unit 349 can be a button sound processor.

It is noted that while the embodiment of FIG. 3B depicts the microphone being located on the spine 330B at about the apex thereof, in an alternate embodiment, the microphone can be located in a manner corresponding to that of FIG. 2C. It is further noted that the microphone can be located on the ear hook 290 anywhere from and including the tip thereof to the location where the ear hook interfaces with the spine. Such is also the case with respect to the microphone located on the spine 330B—the microphone can be located anywhere on the spine from the interface of the spine in the ear hook 290 to the interface of the battery 252 with the spine 330B. Still further, as noted above, BTE device 340 can include a plurality of microphones located according to the various teachings detailed herein and/or variations thereof. In this regard, the aforementioned locations of the various microphones are applicable to the other embodiments detailed herein, such as by way of example, the embodiment of FIG. 2A, along with the embodiments that will be detailed below. Any microphone placement that can enable the teachings detailed herein and/or variations thereof to be practiced can be utilized in at least some exemplary embodiments.

In some exemplary embodiments, any device, system, and/or method that will enable the teachings detailed herein and/or variations thereof associated with vibration transmission from the actuator to the skin and/or to bone of the recipient may be utilized.

Some additional embodiments of some exemplary embodiments will now be described. As a baseline for the teachings detailed below, the BTE device 340 detailed above will be utilized as the baseline. That is, the BTE device 340 utilizing the remote vibrator actuator unit 349 will be the device upon which the following teachings are based. It is noted however, that in alternate embodiments, any of the following teachings can be applied or otherwise combined with the embodiment of FIG. 2A, where the vibrator is an integral portion with the BTE spine 230.

Figure 4:
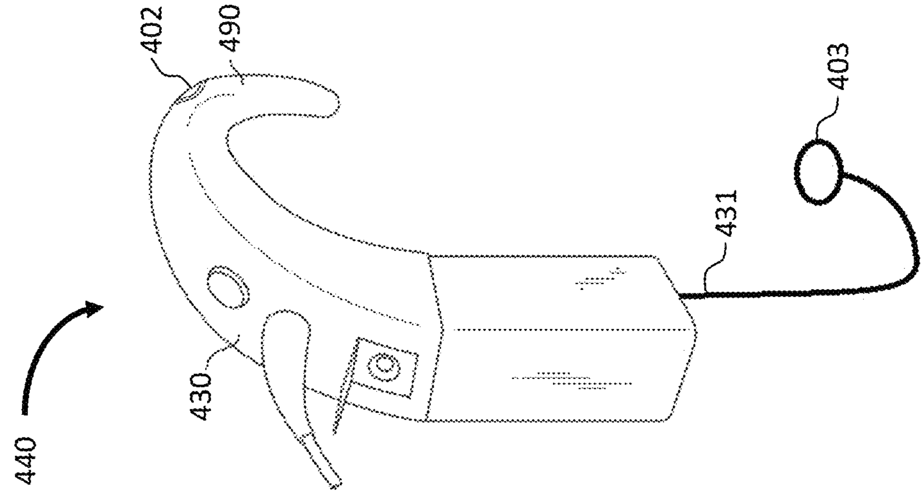
FIG. 4 is a perspective view of an alternate embodiment of an external device including a BTE device.
Figure 5A:
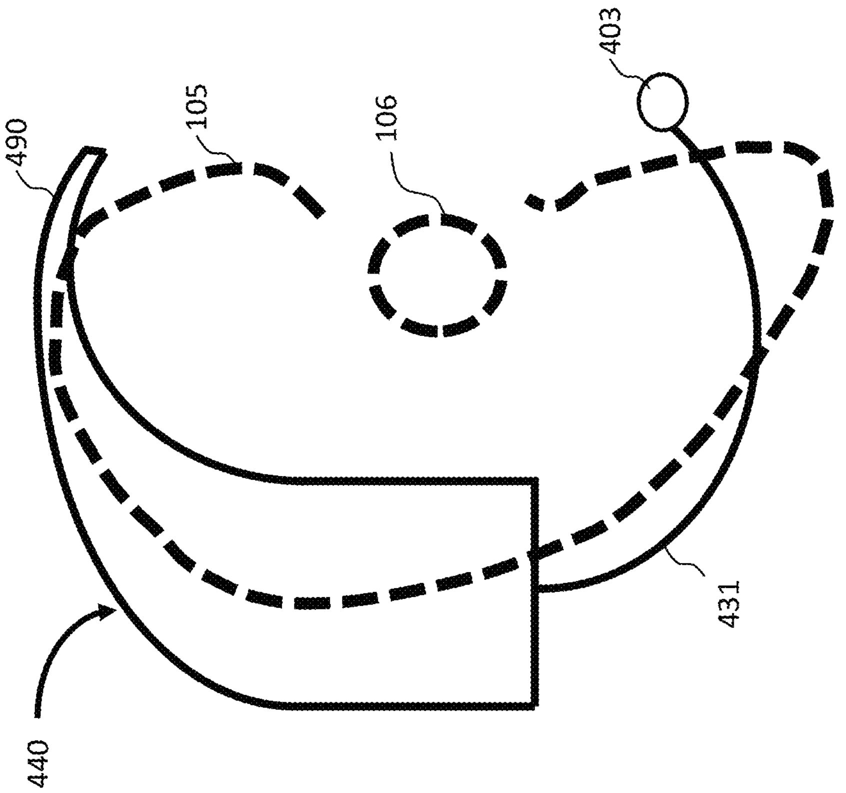
FIG. 5A is a side functional/conceptual view of an alternate embodiment of an external device including a BTE device.

FIG. 4 depicts an alternate embodiment of a BTE device 440 that includes a microphone 402 that is located on the ear hook 490. As can be seen, the ear hook 490 is an integral portion of the spine 430. That said, in alternate embodiments, the ear hook 490 can be a separate component from the spine 430, concomitant with the embodiment of, for example, FIG. 3B detailed above. Still further, this particular embodiment includes a second microphone 403. The second microphone is located or otherwise supported on a stem 431 that extends from the bottom of the battery of the BTE device. FIG. 5A depicts a quasi-functional representation of the utilization of the BTE device 440 of FIG. 4. In FIG. 5A, the pinna 105 is depicted along with the ear canal 106 for purposes of illustration. As can be seen, the ear hook 490 extends about the top of the pinna to the front of the ear in a manner of the traditional BTE device. The stem 431 extends from the bottom of the battery portion/main body of the BTE device and arcs around, underneath the pinna 105 to the front of the ear, where the microphone 403 is supported in front of the ear and below the ear canal 106. Briefly, it is noted that in at least some exemplary embodiments, the BTE device 440 is configured so as to only utilize the output of one of the two microphones 402 and/or 403 during sound processing to evoke a hearing percept.

Figure 5B:
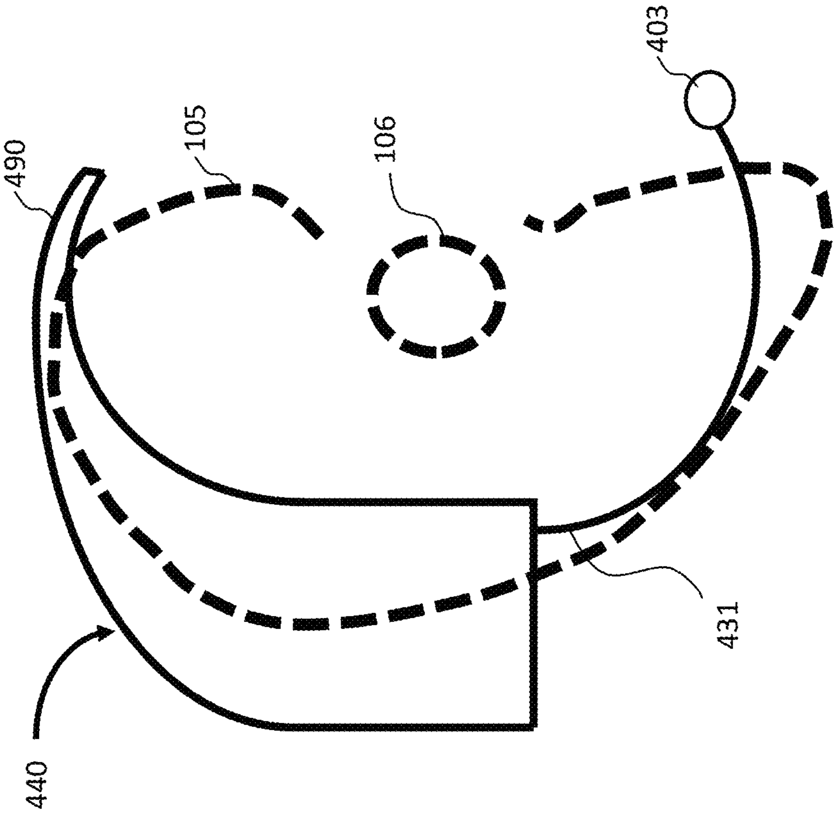
FIG. 5B is a side functional/conceptual view of an alternate embodiment of an external device including a BTE device.

Still with reference to FIG. 5A, it can be seen that the spine 431 follows the general profile of the pinna 105 and extends underneath the pinna (again, with reference to looking at the recipient with respect to the frame of reference seen in FIG. 5) such that a relatively large portion of the stem 431 is eclipsed by the lower portions of the pinna 105. FIG. 5B depicts an alternate embodiment where almost the entire spine 431 is eclipsed by the pinna 105. In an exemplary embodiment depicted in FIG. 5B, the spine 431 at least generally follows the "joint" of the pinna with the rest of the head of the recipient until reaching the front of the pinna 105. In an exemplary embodiment, the spine 431 is a malleable component and/or a flexible component. Any arrangement that will enable the teachings detailed herein and/or variations thereof to be practiced can be utilized in at least some exemplary embodiments.

In view of the above, in an exemplary embodiment, there is a hearing prosthesis, such as that embodied in the BTE device 440 of FIG. 4, wherein the BTE device includes an ear hook 490 configured to extend about a top of the pinna so as to support the BTE device behind the pinna. In this exemplary embodiment, the BTE device 440 includes an extension structure 431 that extends under a bottom of the pinna so as to locate the microphone 403 in front of the pinna, as can be seen in FIG. 5A. Still with reference to FIG. 5A, the hearing prosthesis is configured such that the microphone 403 is located in front of the pinna when the BTE device is secured behind the pinna.

Figure 6:
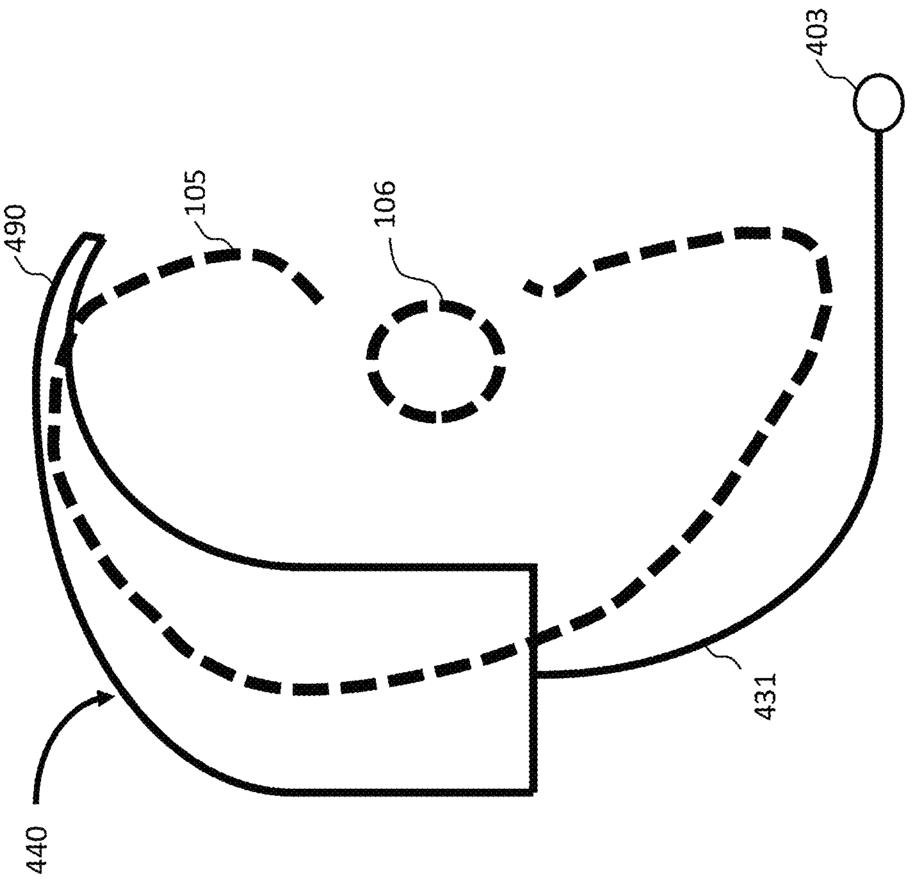
FIG. 6 is a side functional/conceptual view of an alternate embodiment of an external device including a BTE device.

FIG. 6 depicts an alternate embodiment of a BTE device 440, where the spine 431 is not eclipsed at all by the pinna 105. Again, in an exemplary embodiment, the stem 431 can be flexible and/or malleable. In this regard, in an exemplary embodiment, the stem 431 can correspond to a cable or the like that has sufficient structural integrity to support the microphone 403. The cable can be springlike and/or can be malleable, such as by way of example only and not by way of limitation, that which would result from an extruded 12 gauge (U.S. wiring standard) copper wire or the like.

Some additional details of the various embodiments associated with BTE device 440 and variations thereof in alternate hearing prostheses will be described in greater detail below. First, however, some utilitarian aspects of the BTE device 440 will now be described.

Figure 7A:
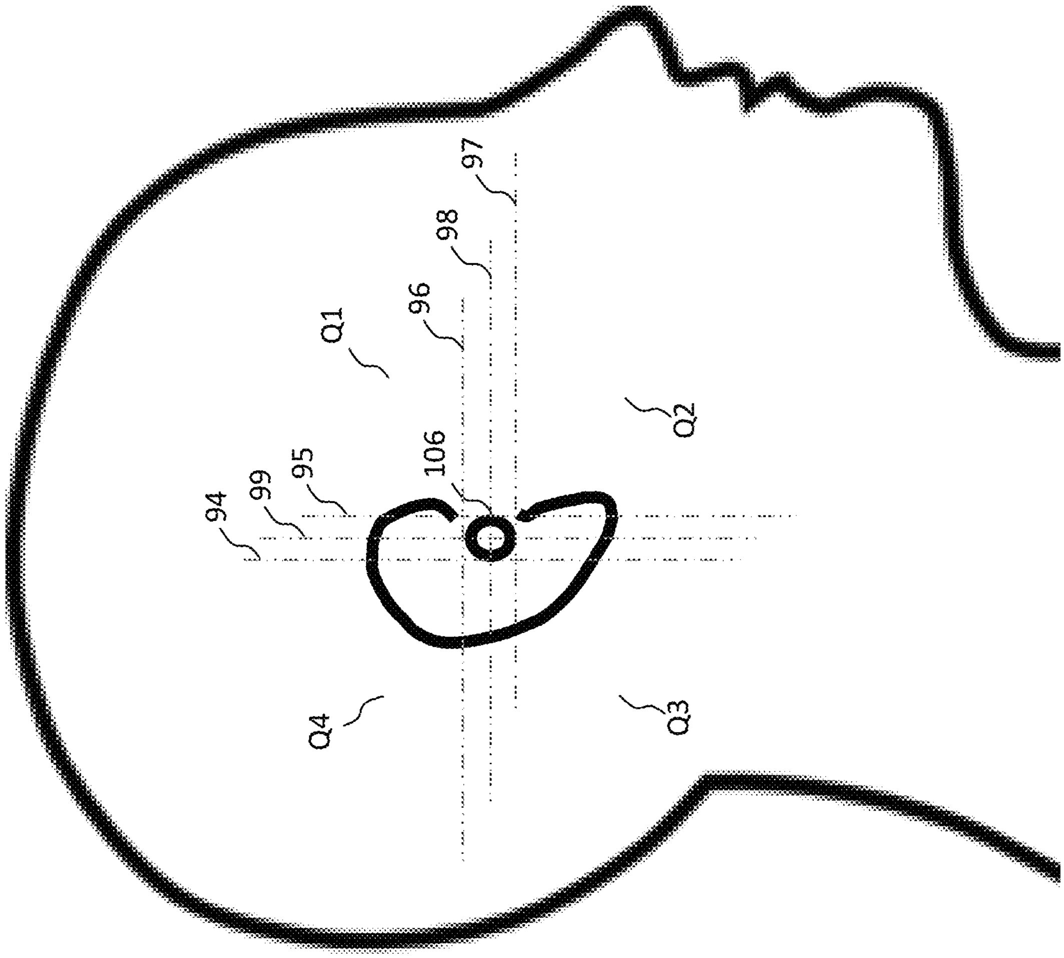
FIGS. 7A and 7B are schematics of frame of references that are based upon the outer skin of the recipient according to some exemplary embodiments.

With respect to FIG. 7A, there is a quadrant system presented that is centered about the ear canal 106 of the recipient. As can be seen, it is established by a vertical line 99 and a horizontal line 98 centered at the center of the ear canal 106. These lines establish four quadrants about the ear canal: Q1, Q2, Q3, and Q4. As will be understood, these quadrants generally follow the 12 hour clock, with quadrant 1 falling between the 12 o'clock position and the 3 o'clock position, quadrant 2 falling between the 3 o'clock position and the 6 o'clock position, quadrant 3 falling between the 6 o'clock position and the 9 o'clock position, and quadrant 4 falling between the 9 o'clock position and the 12 o'clock position. As can be seen with respect to FIGS. 5A, 5B, and 6, the lower microphone 403 falls in the second quadrant. This is opposed to the microphone of the embodiments of FIG. 2A, which falls at about the border of quadrant 4 and quadrant 1, and the microphone 402 of the embodiment of FIG. 4, which falls within quadrant 1. Accordingly, in an exemplary embodiment, there is a hearing prosthesis device configured such that sound is captured at a location that is in the second quadrant about the ear canal, and there is a hearing prosthesis device that includes a sound capture device, such as by way of example, a microphone, that is located in the second quadrant about the ear canal when the hearing prosthesis is worn on the head of the recipient.

In an exemplary embodiment, this can have utilitarian value with respect to reducing feedback relative to that which would be the case with respect to the embodiments where the microphones are located in the fourth quadrant and/or in the first quadrant about the ear canal. More specifically, in an exemplary embodiment, as noted above, the vibrations generated by the vibrating actuator, such as vibrating actuator 242, are directed into the mastoid bone of the skull. These vibrations travel through and along the mastoid bone to reach the cochlea so as to evoke a bone conduction hearing percept. In some instances, these vibrations also travel along the mastoid bone to a location proximate a microphone of the hearing prosthesis, such as microphone 402 with respect to the embodiment of FIG. 4. These vibrations radiate from the mastoid bone, through the soft tissue of the skin, and then to the device, and then to the microphone 402, which can cause the feedback (in some alternate scenarios, the vibrations radiate from the mastoid bone, to the soft tissue, and then from the soft tissue into the air, and then to the microphone, or a combination of both transmission regimes, thus causing feedback). In an exemplary embodiment, because the second quadrant about the ear canal is located away from the mastoid bone/the mastoid bone does not extend into the second quadrant in any meaningful way, such can have utilitarian value with respect to the teachings detailed herein. Thus, the vibrations that are imparted into the mastoid bone and travel along the mastoid bone towards the microphone and ultimately reach a medium discontinuity that might otherwise not be present in a scenario where the microphone was located in the fourth quadrant and/or in the first quadrant. This is because the mastoid bone does not significantly extend into the second quadrant/does not extend to a location in the second quadrant where the microphone would be located.

Figure 7B:
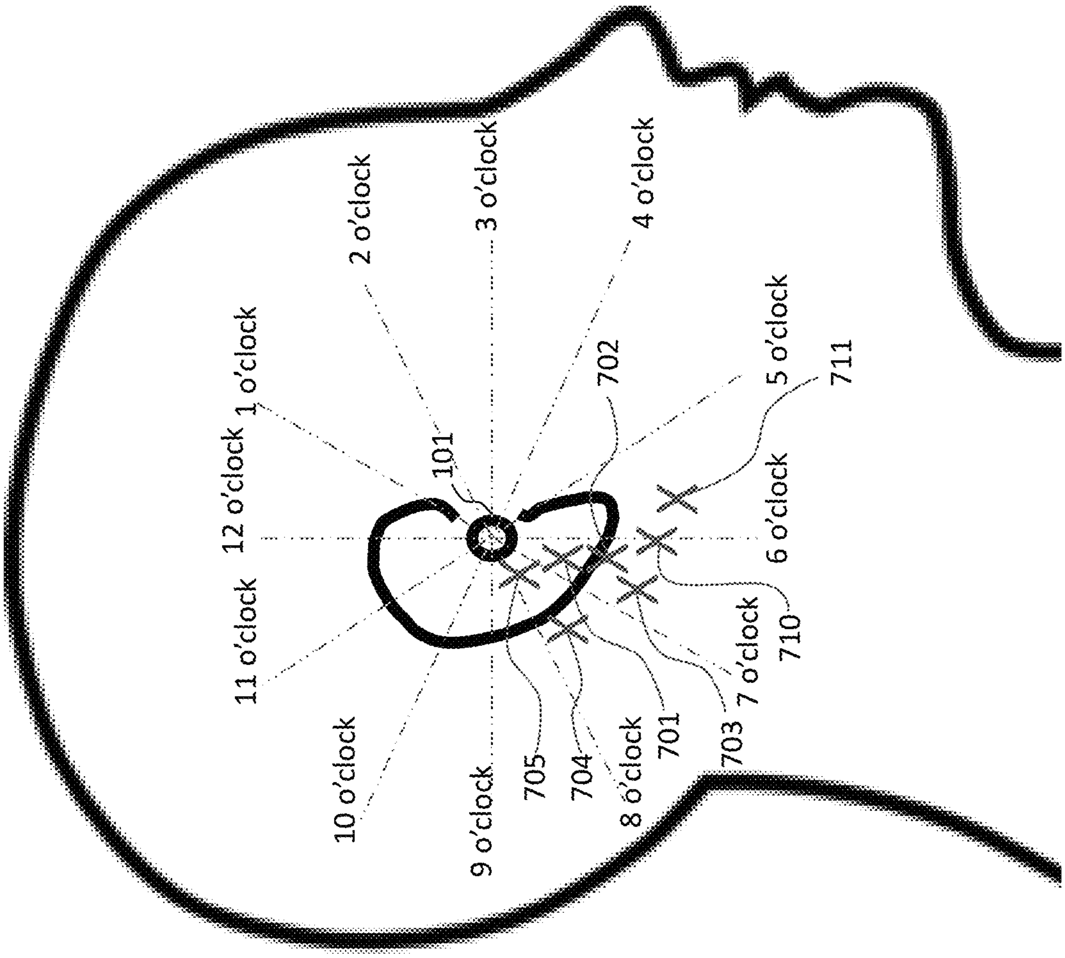

FIG. 7B depicts an alternate coordinate system based on a 12 hour clock centered about the ear canal 106. FIG. 7B depicts some exemplary microphone placement locations corresponding to the "X"s as seen. As can be seen, in some exemplary embodiments, such as that represented by element 711, the microphone can be located between the 5 o'clock and the 6 o'clock position, concomitant with the teachings detailed above with respect to microphone placement in the second quadrant about the ear canal 106. That said, in some alternate embodiments, some of the microphones can be located in the third quadrant in view of the location of the underlying mastoid bone and/or temporal bone, as will be described in greater detail below. Briefly, it is noted that FIG. 7B depicts some exemplary locations of such microphones, with respect to the location of elements 701, 702, 703, 704, 705, and 710, all of which are presented by way of example only and not by way of limitation.

Figure 8A:
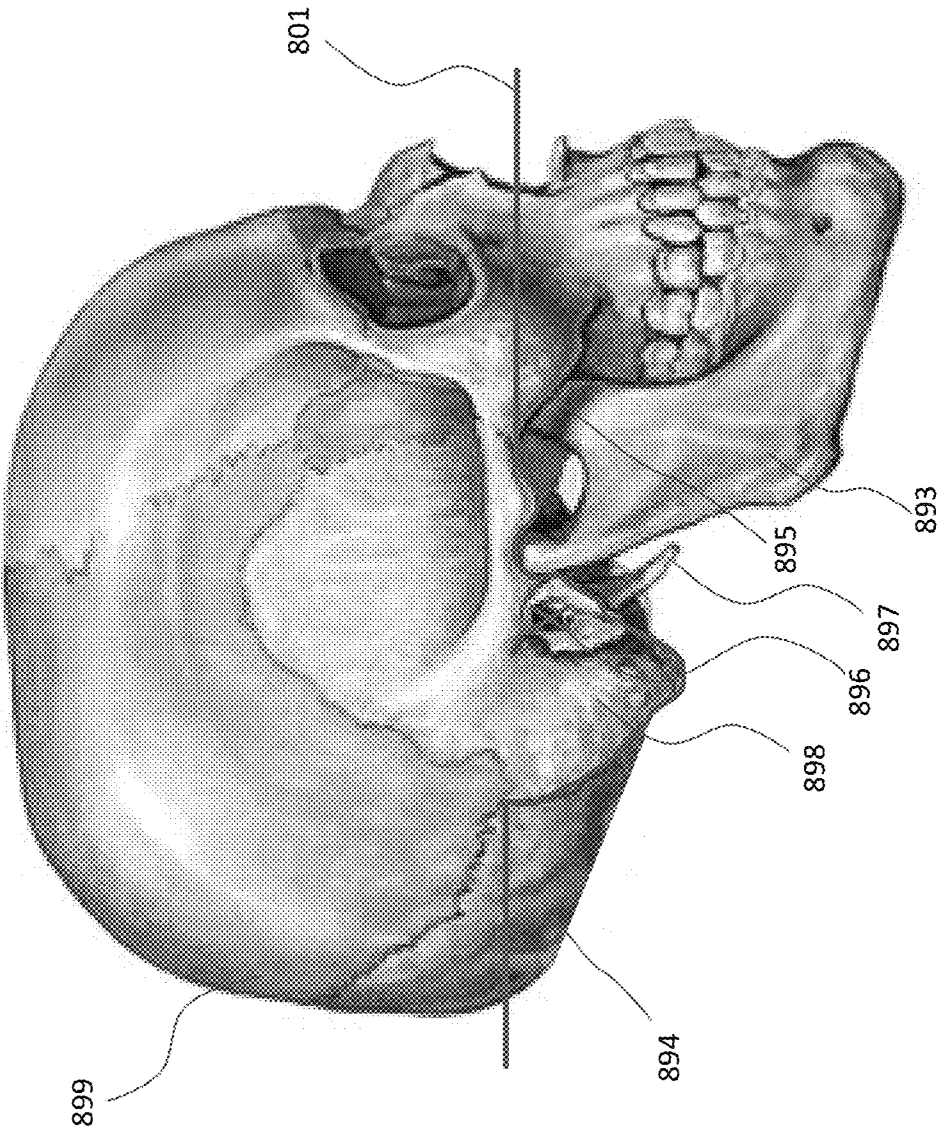
FIGS. 8A, 8B, and 8C are schematics of frame of references according to some exemplary embodiments that are based upon the skeletal structure of the recipient.

FIG. 8A depicts a side view of a human skull that has been annotated. As can be seen, the parietal bone 899 and the occipital bone 894 abut the mastoid bone 898. The zygomatic bone 895 and the mandible bone 893 are depicted to the right of the external acoustic canal 896. It is noted that the styloid process 897 is not considered to be part of the mastoid bone 898 for the purposes of this application. Superimposed upon the view of the skull is a borderline 801. Traveling from right to left, the borderline 801 extends along a horizontal line that has the same latitude (direction up and down with respect to the frame of reference of FIG. 8A) as the junction of the temporal bone and the zygomatic bone. The borderline then follows the lower border of the mastoid bone to the location where the mastoid bone and the occipital bone and the parietal bone meet, and then extends along a horizontal line that has the same latitude as that meeting junction.

Figure 8B:
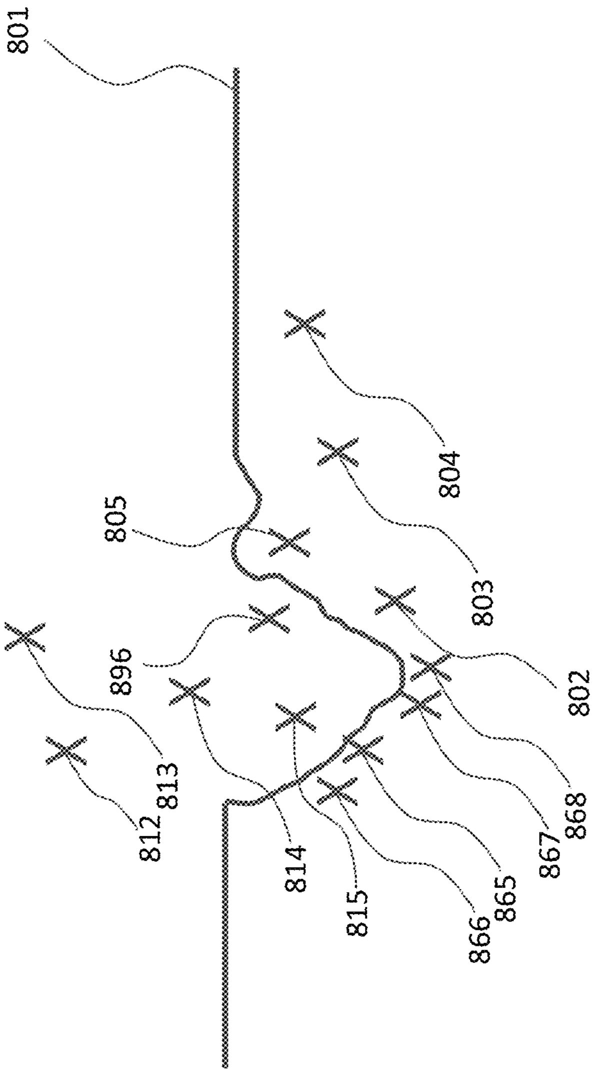

FIG. 8B depicts the borderline 801 in free space without the skull in the background, but showing the acoustic canal 896 (or, more accurately, the centerline of the acoustic canal 896, centered at the junction of the "X"). In at least some exemplary embodiments, the hearing prosthesis is configured such that, during normal wearing implementations, at least one sound capture device, such as a microphone, of the hearing prosthesis is located "South" (or below) of the borderline 801. For example, positions 802, 803, 804, and 805 represent various locations of a sound capture device of a hearing prosthesis, according to an exemplary embodiment, that are south of the borderline 801. As can be seen, these positions are all located in the second quadrant about the ear canal. That said, some alternate embodiments can be located outside that second quadrant, as would be understood with respect to FIG. 8B.

It is noted that in an exemplary embodiment, placement of the microphone "below" the border 801 of FIGS. 8A and 8B results in the microphone being located away from the mastoid bone, even though the microphone might be located over other portions of the skull. Note further, that placement of the microphone below the border 801 results in the microphone being located away from those portions of the temporal bone that are proximate the skin surface. In this regard, while the microphone might be located over the styloid process 897, because the styloid process is not a bone that is proximate the skin surface (as opposed to the mastoid bone), the microphone is still located away from the portions of the temporal bone that are proximate the skin surface. Another way of saying this is that the microphone is located away from all portions of the temporal bone other than the styloid process.

Corollary to this exemplary embodiment is that in at least some instances, the vibrator is located "North" (or above) of the borderline 801. Such possible locations for the vibrator are depicted at positions 812, 813, 814 and 815. More specifically, in an exemplary embodiment, positions 812, 813, 814, and 815 correspond to the location where the maximum vibrational energy that is generated by the actuator of the hearing prosthesis enters the temporal bone. In this regard, it is noted that these positions could be positions corresponding to a so-called active transcutaneous bone conduction device (e.g., these positions could be positions of implanted actuators that vibrate in response to captured sound by the microphone of the hearing prosthesis). Accordingly, teachings detailed herein are applicable to an active transcutaneous bone conduction device.

It is briefly noted at this time that the borderline 801 can be considered somewhat analogous to the coast line of southern Asia, where the bulge corresponds to the Indian subcontinent. The area south of the borderline corresponds to the Indian Ocean (where for the purposes of ease of discussion the Bay of Bengal is considered to be part of the Indian Ocean). Accordingly, any description of any landmass, or ship, or otherwise any body that is located in the Indian Ocean can be utilized to describe the placement of the microphone(s), at least by analogy. Accordingly, the position of the microphone can be analogous to the location of Sri Lanka relative to the coast of the Indian subcontinent/mainland Asia. The position of the microphone can be analogous to the location of Diego Garcia in some instances.

In view of the above, the microphone placements can be locations where the mastoid bone and/or the temporal bone is not located underneath the location of the microphone. In this regard, embodiments correspond to a bone conduction device where the actuator is connected to the mastoid bone and/or the temporal bone, but the microphone is located at a position away from the mastoid bone and/or the temporal bone (in the sense that the mastoid bone and/or the temporal bone is not directly beneath the location of the microphone—where beneath is analogous to drilling down at a direction normal to the tangent line/surface of the surface of the skin—analogous to drilling an oil well into the Earth that is purely vertical without any horizontal component).

Corollary to the above, with respect to the fact that microphones can be located in the third quadrant, as can be seen, an exemplary embodiment includes a microphone located at position 865 and 866 and 867. Note further that in some embodiments, the microphone is positioned at 868. It is briefly noted that for the purposes of some exemplary embodiments, the figures depicted herein are to be considered drawn to scale, while for some other exemplary embodiments, the figures are not to be considered drawn to scale.

In view of the above, in an exemplary embodiment, the hearing prosthesis is configured such that when it is attached or otherwise connected to the head of a recipient, sound is captured at a location just beneath the mastoid bone. With respect to FIG. 8A, this would be below the lowest most point of borderline 801. Accordingly, with respect to FIG. 8B, this can correspond to location 867 or location 868. Alternatively, and/or in addition to this, in an exemplary embodiment the hearing prosthesis is configured such that the sound is captured at a location just outside an area above the mastoid bone. Accordingly, with respect to FIG. 8B, this could correspond to any of locations 866, 865, 867, 868, 805, 802, etc.

Note further, continuing with reference to FIGS. 8A and 8B, in an exemplary embodiment, the hearing prosthesis is configured such that the sound is captured at a location that is not above the skull (e.g., location 802) when, for example, the BTE device is secured behind the pinna (or with respect to other types of device). By above the skull, it is meant both the fixed portions of the skull and the movable portions of the skull (e.g., the jaw bone/mandible). With respect to “above” the skull, it is meant that if one were to “drill” in a direction normal to the plane of the side of the recipient, the drill would not contact the skull, including the styloid process 897. That said, in an alternate embodiment, the hearing prosthesis is configured such that the location of sound capture is located away from the fixed large bones of the skull during use, such as when the BTE device is secured behind the pinna. For example, this would exclude sound capture over the mastoid bone. However, this would not exclude sound capture over or otherwise proximate the styloid process 897, as that is not a large bone. This would also not exclude sound capture at a location over the mandible 893 as that is not a fixed large bone (it is the movable portion of the skull with respect to the global geometry of the skull).

In view of the teachings herein, in an exemplary embodiment, there is a hearing prosthesis that is configured such that the microphone is located outside a boundary that is overlying the mastoid bone of the recipient. Still further, in some more narrow exemplary embodiments, the hearing prosthesis is configured such that the microphone is located outside a boundary that is overlying the temporal bone of the recipient, where the mastoid bone and the styloid process are parts of the temporal bone. Of course, it is noted that this does not exclude embodiments that utilize two or more microphones, where one of the microphones is located inside a boundary that is overlying the temporal bone of the recipient and/or the mastoid bone of the recipient. That said, in some alternate embodiments utilizing two or more microphones, all microphones are located outside of the aforementioned boundaries and/or outside the other described boundaries and/or at locations detailed herein.

Thus, in an exemplary embodiment, there is a hearing prosthesis according to the teachings detailed herein and/or variations thereof, where during proper wearing thereof, the microphone or otherwise the sound capture device is located at least approximately over the styloid process of the recipient. Corollary to this is that in an exemplary embodiment, the microphone is located within an angle that is centered about the ear canal that entirely encompasses the styloid process. Still further, in an exemplary embodiment, the microphone is located within an angle that is centered about the ear canal that entirely encompasses the styloid process, were in that angle is 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.25, 3.5, 3.75, or 4 times greater than that which is necessary to encompass the entire styloid process within that angle.

Figure 8C:
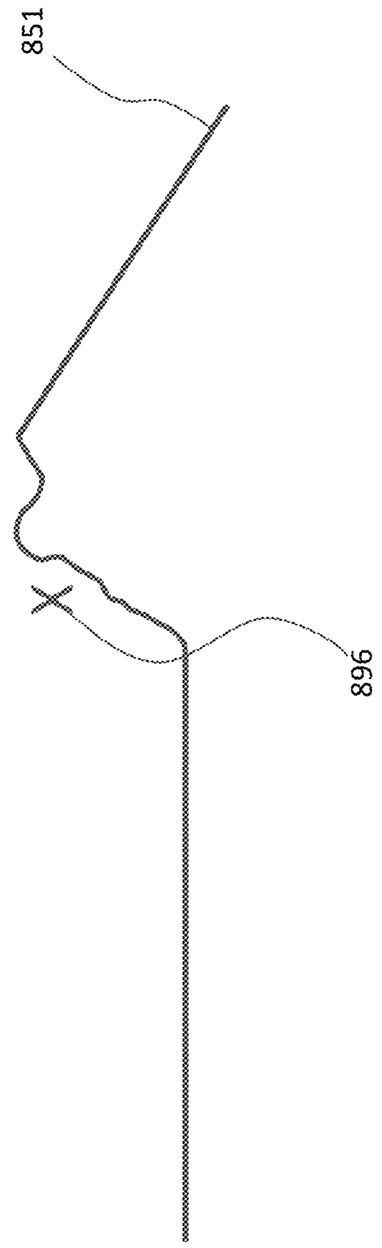

In a similar vein, FIG. 8C depicts another boundary line 851. This boundary line is drawn such that the “large bones” stationary bones of the skull that directly support skin are located above the boundary line, but the “small bones,” such as the styloid process, can be located below this boundary line. To be clear, in some embodiments according to the teachings detailed herein, the microphone is not located over any of the fixed portions of the skull that supports outer skin there above. In this regard, the mastoid bone is a bone that supports skin there above. Conversely, the styloid process does not support skin there above.

Note also that the mandible, which is a movable bone, is located below boundary 851. Accordingly, boundary 851 is a boundary line above which the large bones of the skull that directly support skin are located. In an exemplary embodiment, the microphone can be located below boundary 851. In some embodiments, there is a boundary with respect to the frames of reference of FIGS. 8A-8C, where the boundary is a boundary that excludes all of the large bones of the skull, including the mandible, that directly support skin, but the small bones, such as the styloid process, can be located below this boundary. In an exemplary embodiment, the microphone is located below this boundary.

To be clear, the boundaries of FIGS. 8A-8C are all with respect to the frame of reference of the skull seen in FIG. 8A. That is, the boundaries depicted in the latter figures can be superimposed onto the skull of FIG. 8A, because the axial alignment about "X" 896 is the same.

So as to provide some additional disclosure, it is noted that both FIGS. 7A, 7B, 8A, and 8B, depict locations relative to the center of the ear canal 106 with respect to the first two figures, and the center of the acoustic canal 896 with respect to the latter two figures. With respect to some angular coordinate information, utilizing the 12 o'clock position as the zero angle, with respect to all figures disclosed herein, relative to the center of the ear canal 106 and the acoustic canal 896 respectively, depending on the physiological features of the given human, microphone positions can be located at about (including exactly at) 70°, 75°, 80°, 85°, 90°, 95°, 100°, 105°, 110°, 115°, 120°, 125°, 130°, 135°, 140°, 145°, 150°, 155°, 160°, 165°, 170°, 175°, 180°, 185°, 190°, 195°, 200°, 205°, 210°, 215°, 220°, 225°, 230°, 235°, 240°, 245°, 250°, 255°, 260°, 265°, 270°, 275°, 280°, 285°, and/or 290°, or any value or range of values therebetween in about 1° increments (about 111 degrees, about 177 degrees, about 113 to about 171 degrees, etc.).

Note further, with respect to distance from the center of the ear canal 106 and the acoustic canal 896, respectively, the distance they are from can be about 0.25 inches, 0.3 inches 0.35 inches, 0.4 inches, 0.45 inches, 0.5 inches, 0.55 inches, 0.6 inches, 0.55 inches, 0.7 inches, 0.75 inches, 0.8 inches, 0.85 inches, 0.9 inches, 0.95 inches, 1 inch, 1.1 inches, 1.2 inches, 1.3 inches, 1.4 inches, 1.5 inches, 1.6 inches, 1.7 inches, 1.8 inches, 1.9 inches, 2 inches, 2.1 inches, 2.2 inches, 2.3 inches, 2.4 inches, 2.5 inches, 2.6 inches, 2.7 inches, 2.8 inches, 2.9 inches, 3 inches, or more or any value or range of values therebetween in 0.01 inches. Accordingly, any of these above combinations can be utilized in at least some exemplary embodiments at least depending on the physiological circumstances of the recipient. Thus, any of the aforementioned angle orientation values can be combined with any of the aforementioned distance values to establish a coordinate location relative to the ear canal 106 and/or the acoustic canal 896 as the case may be. It is further noted that in at least some exemplary embodiments, the aforementioned values that are utilized are those for the human factors 25, 30, 35, 40, 45, 50, 55, 60, 65, 70, and/or 75 percentile (or any value or range of values therebetween in 1 percentile increments) male and/or female inhabitant of the North American continent above the Rio Grande River as of May 13, 2015.

Figure 9A:
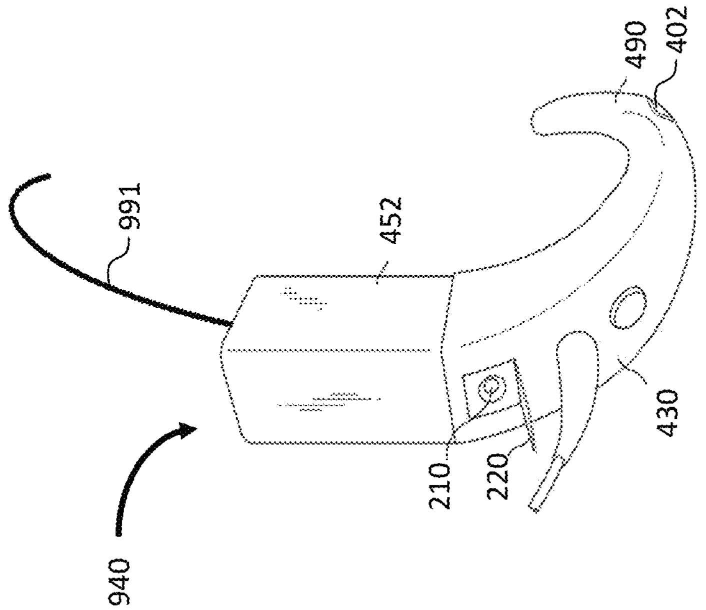
FIG. 9A is a perspective view of an alternate embodiment of an external device including a BTE device.

Some exemplary embodiments that can achieve the goal of locating the microphone beneath the borderline 801 and/or within the second quadrant about the ear canal correspond to taking the BTE device 240 of the embodiment of FIG. 2A and inverting that BTE device and adding an ear hook extending from the battery 452. To this end, FIG. 9A depicts such an exemplary embodiment of a BTE device 940. As can be seen, BTE device 940 includes an ear hook 991 extending out of the formally bottom of the battery 451. Any device, system, and/or method that can enable the functionality of the ear hook 490 when the ear hook 490 is utilized in its normal manner (i.e., as the ear hook) can be utilized in at least some exemplary embodiments.

Figure 9B:
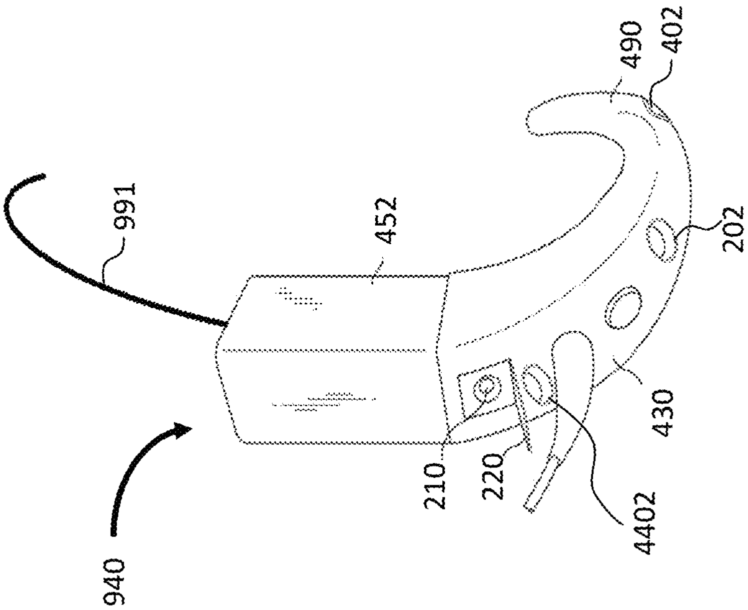
FIG. 9B is a perspective view of an alternate embodiment of an external device including a BTE device.

FIG. 9B depicts an alternate embodiment of the BTE device 940 of FIG. 9A, which includes a plurality of microphones. In addition to the microphone 402 located on the ear hook 490, BTE device 940 includes microphone 202 located on the spine, and microphone 4402 is also located on the spine, except closer to the battery 452. Briefly, it is noted that in at least some exemplary embodiments, the BTE device 940 is configured so as to only utilize the output of one or two of the three microphones during sound processing to evoke a hearing percept. In this regard, in at least some exemplary embodiments, the microphone can be selected that is located away from or otherwise that is not over the mastoid bone and/or the temporal bone of the microphone. Accordingly, in an exemplary embodiment, depending on the wearing condition and/or the physiological condition of the recipient, microphone 4402 might be deactivated and/or microphone 202 might be deactivated, and the hearing percepts that are evoked are based on the output of microphone 402, because microphone 402 is not over the mastoid bone and/or the temporal bone.

In view of the above, in an exemplary embodiment, there is a method corresponding to taking a traditional BTE device, such as BTE device 240 detailed above, and placing an ear hook and/or a spine 991 or any other suitable component onto a lower portion thereof, and flipping that BTE device upside down. Accordingly, there is also an apparatus that corresponds to a traditional BTE device that is reconfigured into the configuration depicted in FIGS. 9A and/or 9B and/or variations thereof.

Figure 10A:
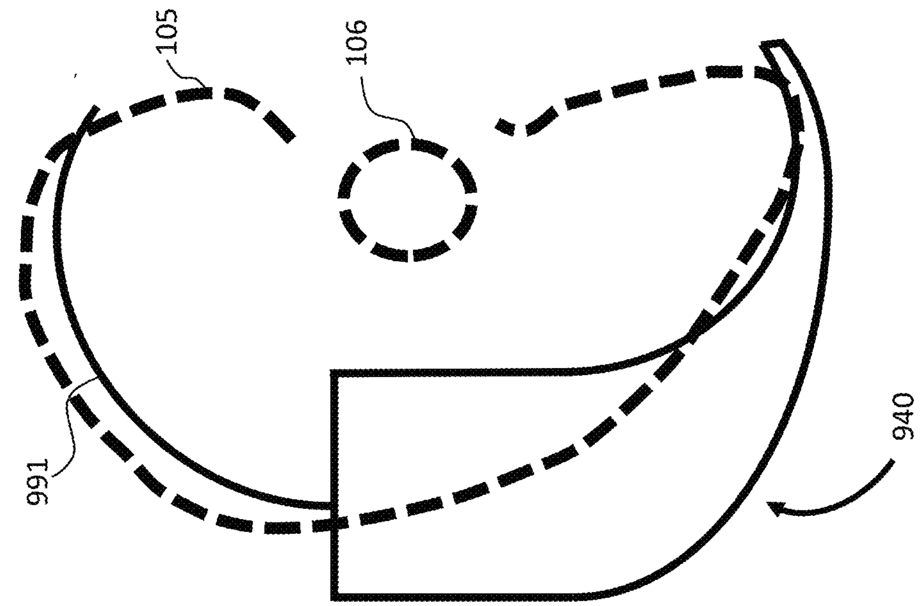
FIG. 10A is a side functional/conceptual view of an alternate embodiment of an external device including a BTE device.

FIG. 10A depicts a quasi-functional representation of the utilization of the BTE device 940 of FIGS. 9A and 9B. In FIG. 10A, the pinna 105 is depicted along with the ear canal 106 for purposes of illustration. As can be seen, the ear hook 991 extends about the top of the pinna to the front of the ear in a manner of the traditional BTE device. Now, however, the ear hook 490 arcs around underneath the pinna 105 to the front of the ear, where the microphone 402 is supported in front of the ear and below the ear canal 106.

Figure 10B:
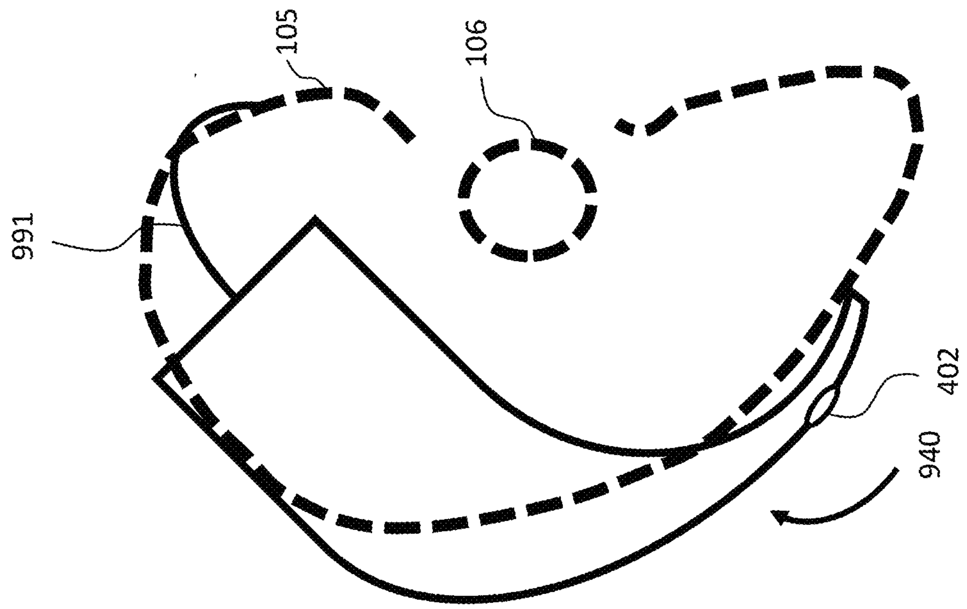
FIG. 10B is a side functional/conceptual view of an alternate embodiment of an external device including a BTE device.

Consistent with the teachings detailed above, it is noted that it is not necessary in all embodiments for the microphones to be located in the second quadrant about the ear canal 106 of the recipient. Indeed, in some exemplary embodiments, there is utilitarian value with respect to placing the microphone in the third quadrant. FIG. 10B depicts such an exemplary embodiment in functional terms. As can be seen, the angle of the BTE device 940 is different than that of FIG. 10A, and thus the microphones thereof will be located in the third quadrant (actually, in the case of the multiple microphone embodiment, microphones are located in the third quadrant and in the fourth quarter). In particular, as can be seen, microphone 402 is located in the third quadrant. As can be seen, the ear hook/spine 991 is of a slightly different configuration than that of FIGS. 9A and 9B, so as to accommodate or otherwise position the BTE device 940 in the angular position about the ear canal 106 as shown. Thus, with respect to the embodiment depicted in 10B, the BTE device is configured such that the microphone 402 is located in back of the pinna 105 when the BTE device is secured behind the pinna 105.

FIG. 10 B depicts another exemplary concept of at least some exemplary embodiments, where the center of gravity of the vibrator of the BTE device is located at a location that is higher with respect to the height direction of the recipient in a location of the microphone 402. Owing to the structure of the given BTE device, and at least some exemplary embodiments, the vibrations from the BTE device are outputted from the BTE device to the skin of the recipient in a direction normal to the plane of the figure. Accordingly, in an exemplary embodiment, the device of FIG. 10 B corresponds to a device where sound is captured at a location that is lower with respect to the height direction of the recipient in a location at which artificially generated energy is imparted into the recipient to evoke a hearing percept.

Corollary to this is that in at least some embodiments, the BTE device includes a vibrator located in a housing assembly of the BTE device (which can be the spine or can be the combination of a housing of the spine and the housing of the ear hook-two separate housings that are assembled together) configured to be located behind the ear of the recipient, and the sound is captured with a sound capture device that is supported by the housing assembly of the BTE device. In at least some exemplary embodiments of some such embodiments, the sound is captured at a location that is lower than the location of the vibrator, or at least the center of gravity of the vibrator. Still further, in an exemplary embodiment, the sound is captured with a sound capture device, such as a microphone, where the vibrator and the sound capture device are part of the same body of the hearing prosthesis (i.e., the body of the BTE device). This is as distinguished from, for example, the embodiment of FIG. 3B, where the vibrator is located away from the body of the BTE device. Still, with respect to at least some exemplary embodiments where the vibrator is located remotely from the body of the BTE device, in an exemplary embodiment, the wired attachment location on the body of the BTE device where the remote component attaches to the body of the BTE device is located at a location that is above the location of the microphone.

Figure 11A:
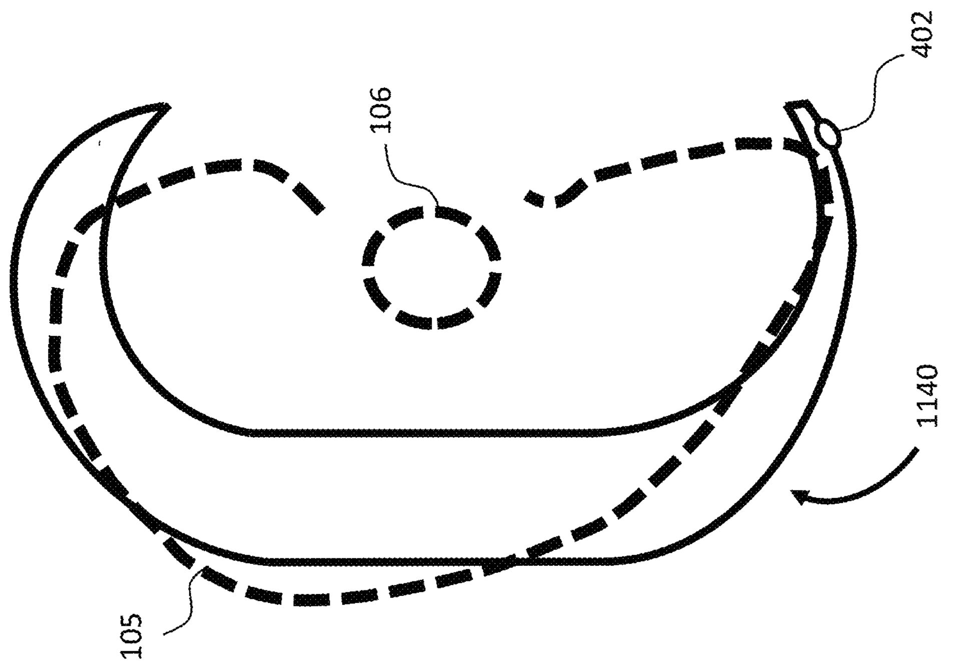
FIG. 11A is a side functional/conceptual view of an alternate embodiment of an external device including a BTE device.
Figure 11B:
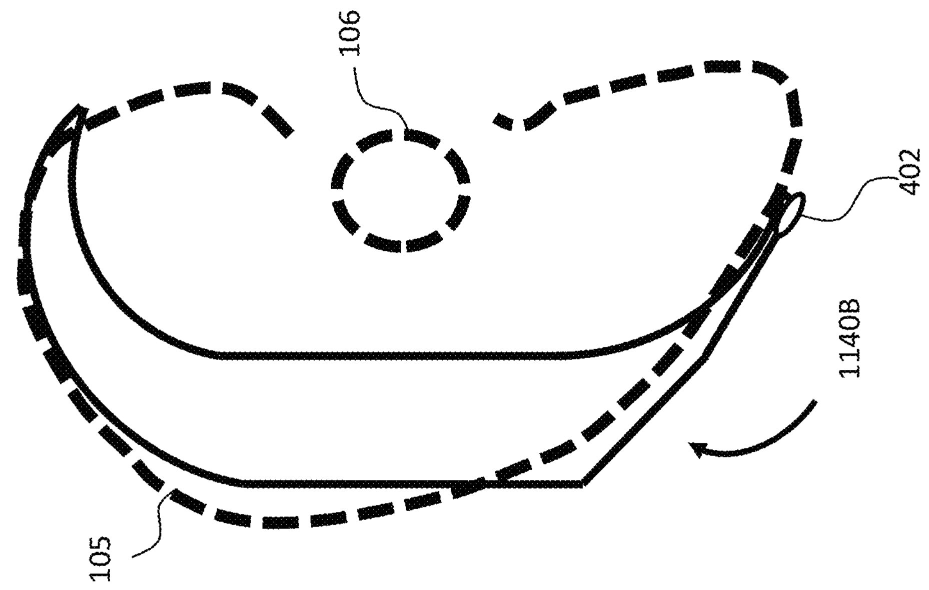
FIG. 11B is a side functional/conceptual view of an alternate embodiment of an external device including a BTE device.
Figure 11C:
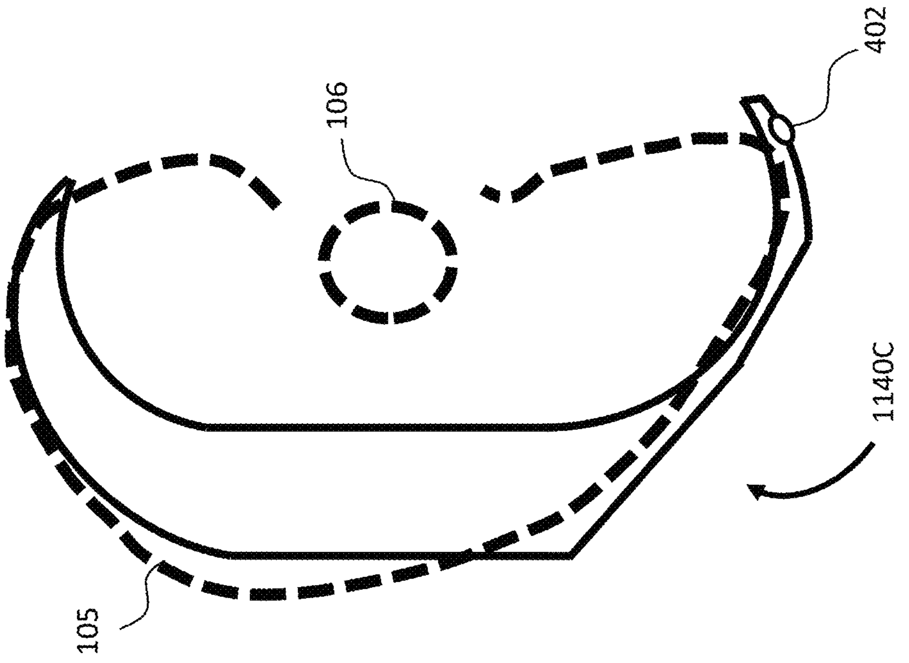
FIG. 11C is a side functional/conceptual view of an alternate embodiment of an external device including a BTE device.

In view of the fact that embodiments include features that extend the BTE device such that a component thereof extends about the under portion of the ear into the second quadrant, such can be utilized to reduce the overall width and/or profile of the BTE device, relative to the view looking at the recipient from the side. FIG. 11A depicts an exemplary embodiment of a BTE device 1140, where the width of the BTE device is narrower relative to that of the embodiments of FIGS. 10A and 10B. In this regard, width has been traded for length. Accordingly, more of the BTE device is “hidden” or otherwise eclipsed by the pinna 105 relative to that which is the case for the more traditional BTE devices. FIGS. 11B and 11C respectively depict BTE devices 1140B and 1140C, which further embrace this design concept of trading length for width. FIG. 11 B is a BTE device 1140 B that is almost entirely eclipsed by the pinna 1105 as can be seen. In this embodiment, the microphone 402 is located in the third quadrant. Still further, embodiments of FIG. 11 B can include a device that is even more eclipsed by the pinna 105. In an exemplary embodiment, the microphone 402 could be entirely eclipsed by the pinna 105. Conversely, FIG. 11 C includes a low-profile prosthesis where the microphone 402 is located in the second quadrant. Thus, this is more visible to a viewer then the embodiment of FIG. 11 B, but still less visible than some of the other embodiments detailed herein. It is noted that the configuration of FIGS. 11A, 11B, and/or 11C, or at least the design philosophy associated there with, is/are applicable to any of the BTE devices detailed herein.

It is briefly noted that in at least some exemplary embodiments of the embodiment of FIG. 11A, such can have utilitarian value in that the buttons or otherwise the control devices and/or otherwise the user input interface devices located on the body of the BTE device 1140 can be spread apart more from each other and/or located further away from the various microphones than that which might otherwise be the case with respect to the more traditional BTE devices. In an exemplary embodiment, the BTE device can have 1, 2, 3, 4, or 5, or more control input components, one or more or all of which are located more than 0.5, 0.6, 0.7, 0.8, 0.9, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3 inches, or more away from any microphone of the BTE device and/or from other control input components. Such can be done, in at least some embodiments, via making the device longer and slimmer relative to that which is the case with respect to the traditional BTE device.

While various embodiments described above have focused on bone conduction devices, it is noted that at least some of the teachings and/or design concepts disclosed herein can be applicable to other types of hearing prostheses, at least those that are subject to feedback resulting from vibrations traveling through the mastoid bone to a microphone. By way of example only and not by way limitation, the teachings detailed herein can be applicable to middle ear implants and/or mechanical inner ear implants. Any prostheses that creates a vibration or otherwise can produce a mechanical output that can be fed back into the microphone that causes feedback due to the transmission through the mastoid bone (or any other tissue, for that matter, or even through the air, for that matter, and thus in some instances the teachings detailed herein can be applicable to traditional hearing aids that utilize pressure waves impinging upon the outside of the tympanic membrane) can avail itself of the teachings detailed herein and/or variations thereof. Accordingly, embodiments include applying some or all of the teachings detailed herein to middle ear implants and/or mechanical inner ear implants and/or traditional hearing aids, or at least prostheses that utilize those features if only in part (such as by way of example only and not by way of limitation, so-called by modal hearing prostheses).

Figure 12A:
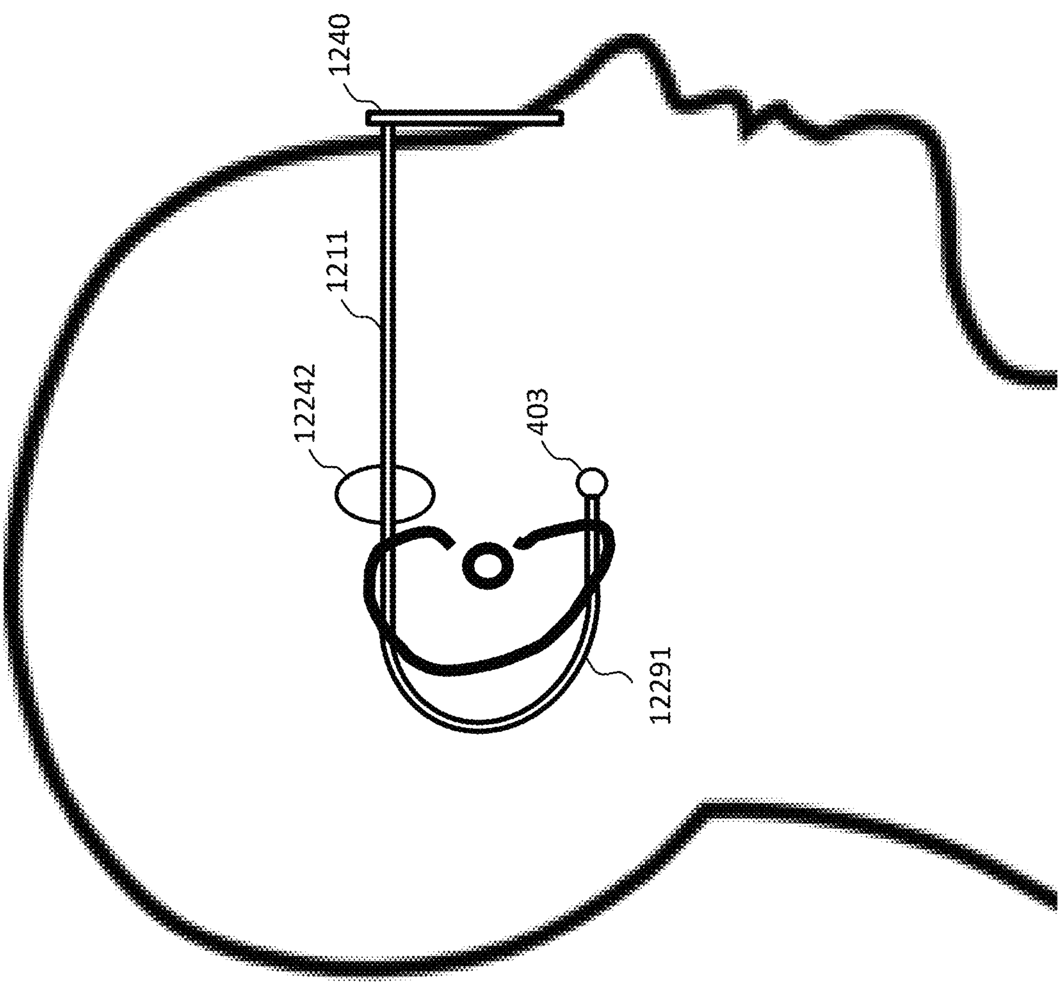
FIG. 12A is a side functional/conceptual view of an alternate embodiment of an external device not using a BTE device.
Figure 12B:
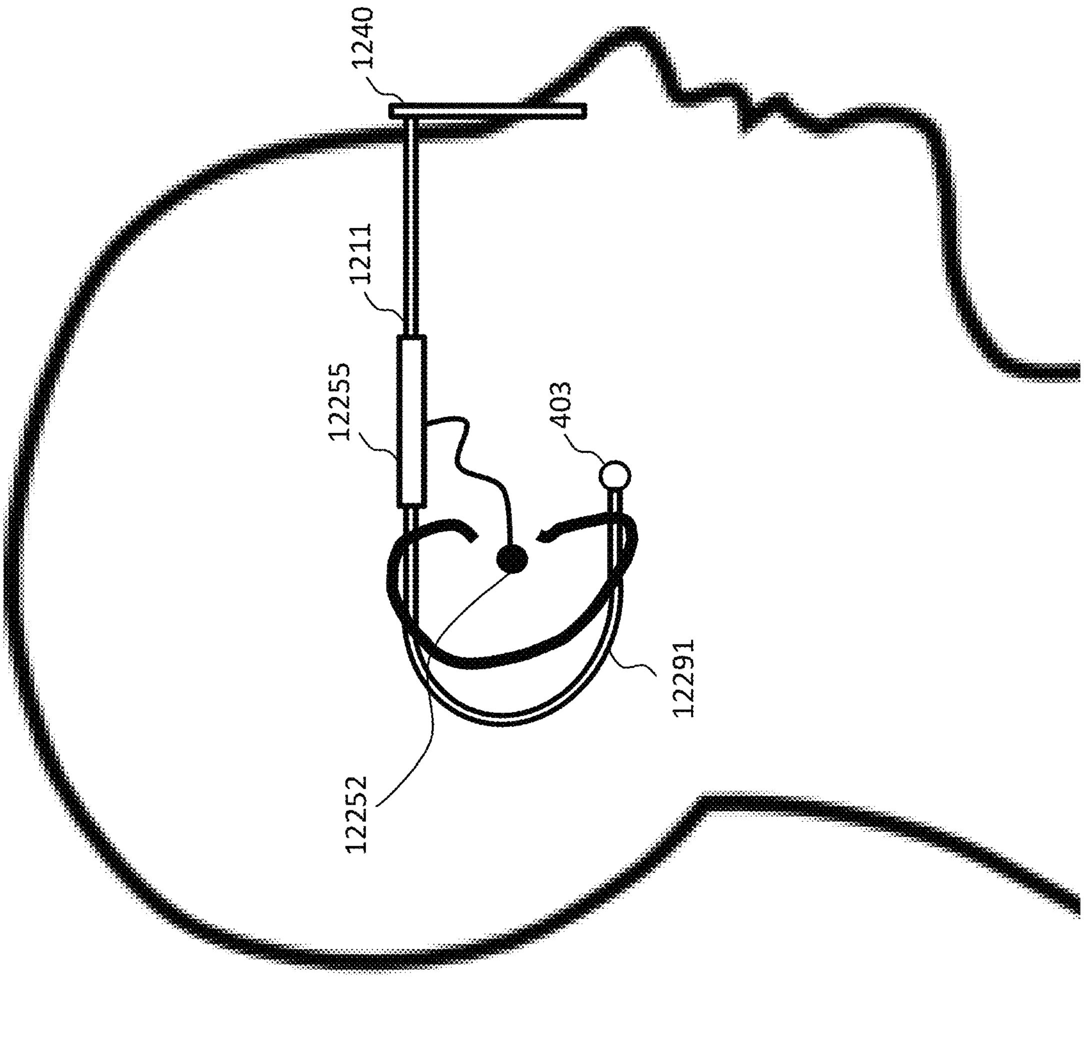
FIG. 12B is a side functional/conceptual view of an alternate embodiment of an external device not using a BTE device.

Still further, it is noted that while various embodiments described above have focused on BTE devices, it is noted that at least some of the teachings and/or design concepts disclosed herein can be applicable to other types of arrangements. In this regard, FIG. 12A depicts an exemplary embodiment of a combination of an ocular prosthesis with a hearing prosthesis. As can be seen, in an exemplary embodiment, the prosthesis includes a pair of glasses 1240 that are connected to a frame 1211, which frame 1211 extends to the ear/outer ear of the recipient in a traditional manner. The frame 1211 supports a vibrator actuator 12242 that is configured to evoke a hearing percept via bone conduction vibration (particularly, via passive transcutaneous bone conduction vibration). As can be seen, a stem 12291 or otherwise secondary frame extends from the primary frame 1211 around the ear and supports the microphone 403 as shown. As can be seen, the microphone 403 is located in the second quadrant about the ear canal. In an exemplary embodiment, microphone 403 is located substantially above (including entirely above) soft-tissue and/or is not located above the mastoid bone and/or the temporal bone, concomitant with the teachings of microphone placement herein according to at least some exemplary embodiments. FIG. 12B depicts an alternate configuration of a different type of hearing prosthesis, such as a conventional hearing aid system combined with an ocular prosthesis. FIG. 12 B depicts a sound processor housing 12255 containing a sound processor, that is in signal communication with a speaker 12252 that is configured to be placed in the ear canal of the recipient (the ear canal is not shown for purposes of clarity). The sound processor housing 12255 is in signal communication with the speaker via an electrical cable as can be seen. As with the embodiment of FIG. 12A, the microphone 43 is positioned at the end of component 12291 in the third quadrant about the ear canal.

Figure 13:
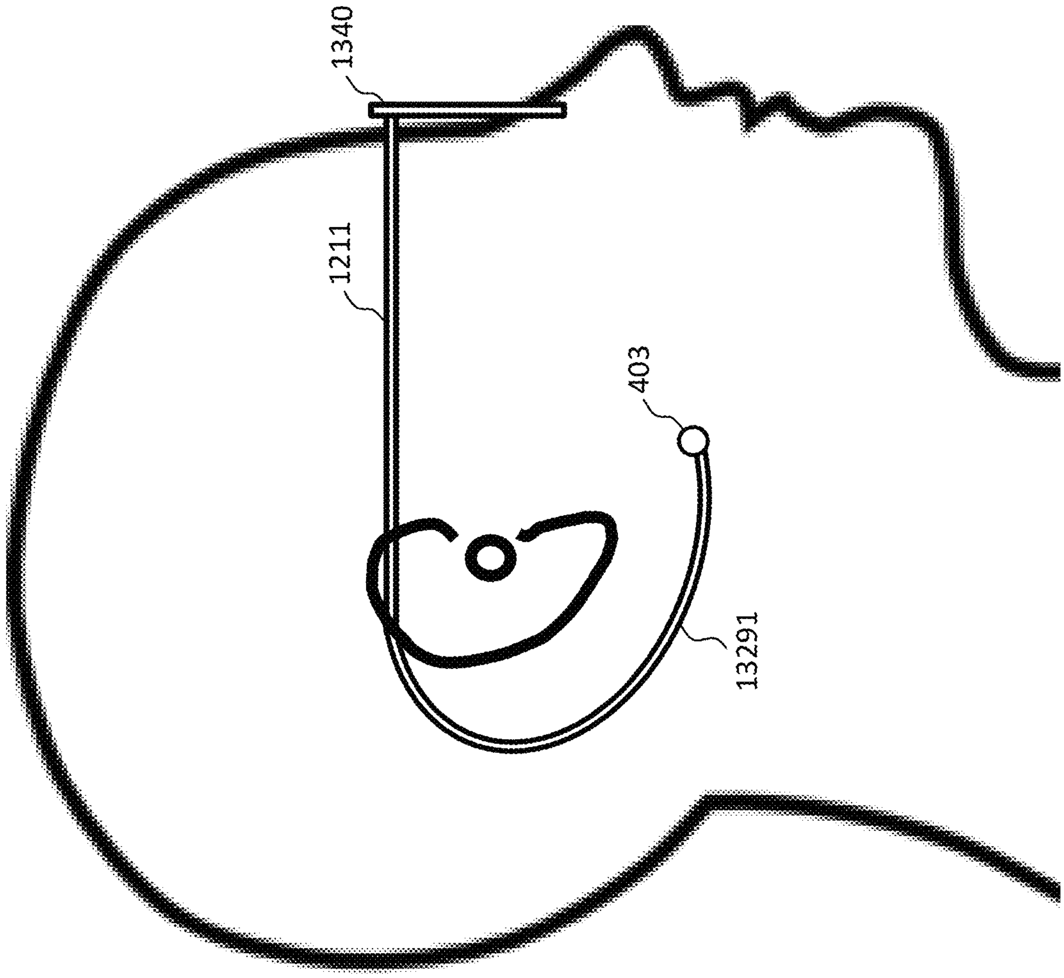
FIG. 13 is a side functional/conceptual view of an alternate embodiment of an external device not using a BTE device.
Figure 14:
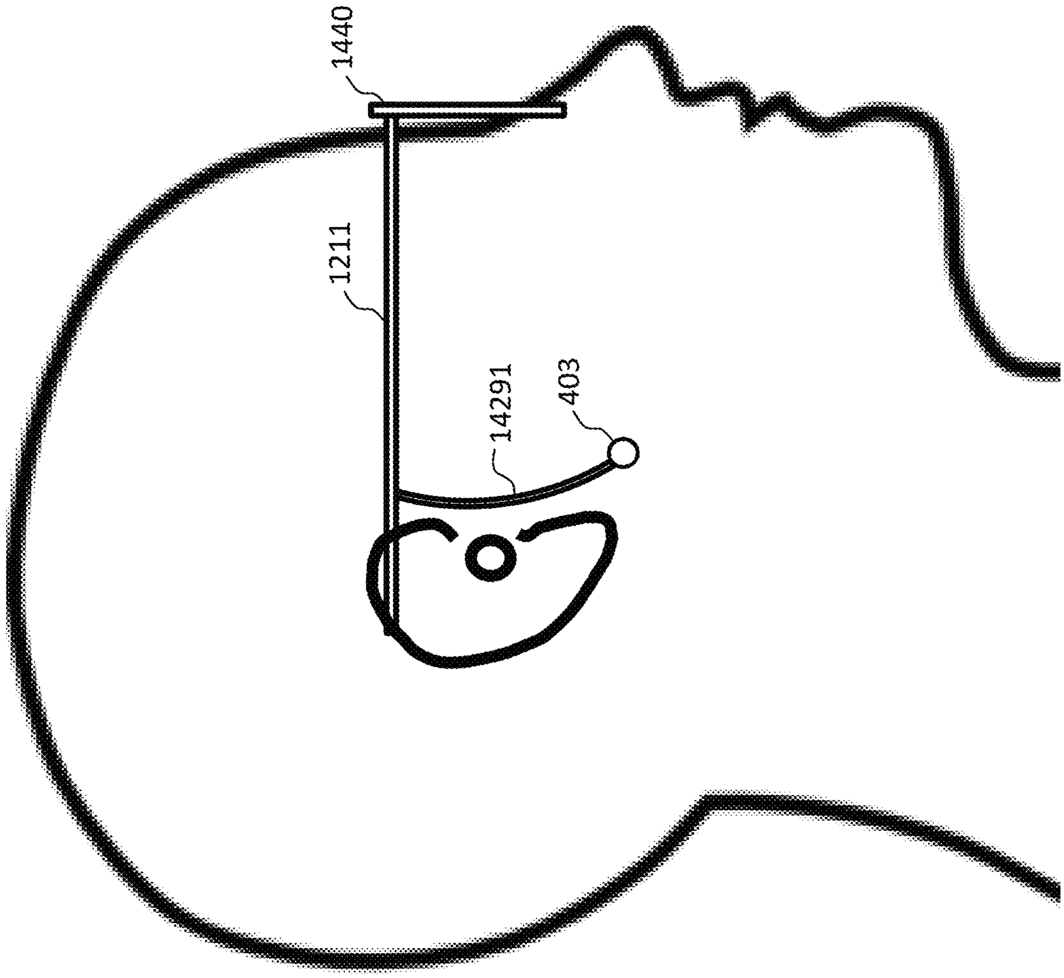
FIG. 14 is a side functional/conceptual view of an alternate embodiment of an external device not using a BTE device.

While the embodiment of FIGS. 12A and 12B depicts the component that supports the microphone 403 as generally hugging or otherwise following the contour of the pinna, in alternative embodiments, the component that supports the microphone 403 is spaced relatively away from the pinna. Some exemplary embodiments of such can be seen in FIGS. 13 and 14. With respect to FIG. 13, there is depicted a prosthesis 1340 that is a combination of an ocular prosthesis in a hearing prosthesis. Prosthesis 1340 includes a support structure/frame 13291, as can be seen arcing about the ear such that no part thereof is eclipsed by the pinna. Granted, a portion of the frame 1211 does become eclipsed by the pinna. However, this portion is nothing different than the traditional frame of the ocular prosthesis. Now with respect to FIG. 14, FIG. 14 also depicts an ocular/hearing prosthesis 1440. Here, frame 14291 supports the microphone 403 by extending from a location of frame 211 in front of the ear. As can be seen in both embodiments, the prosthesis 1340 and the prosthesis 1440 position the microphone 403 in the second quadrant about the ear canal of the recipient.

Figure 15:
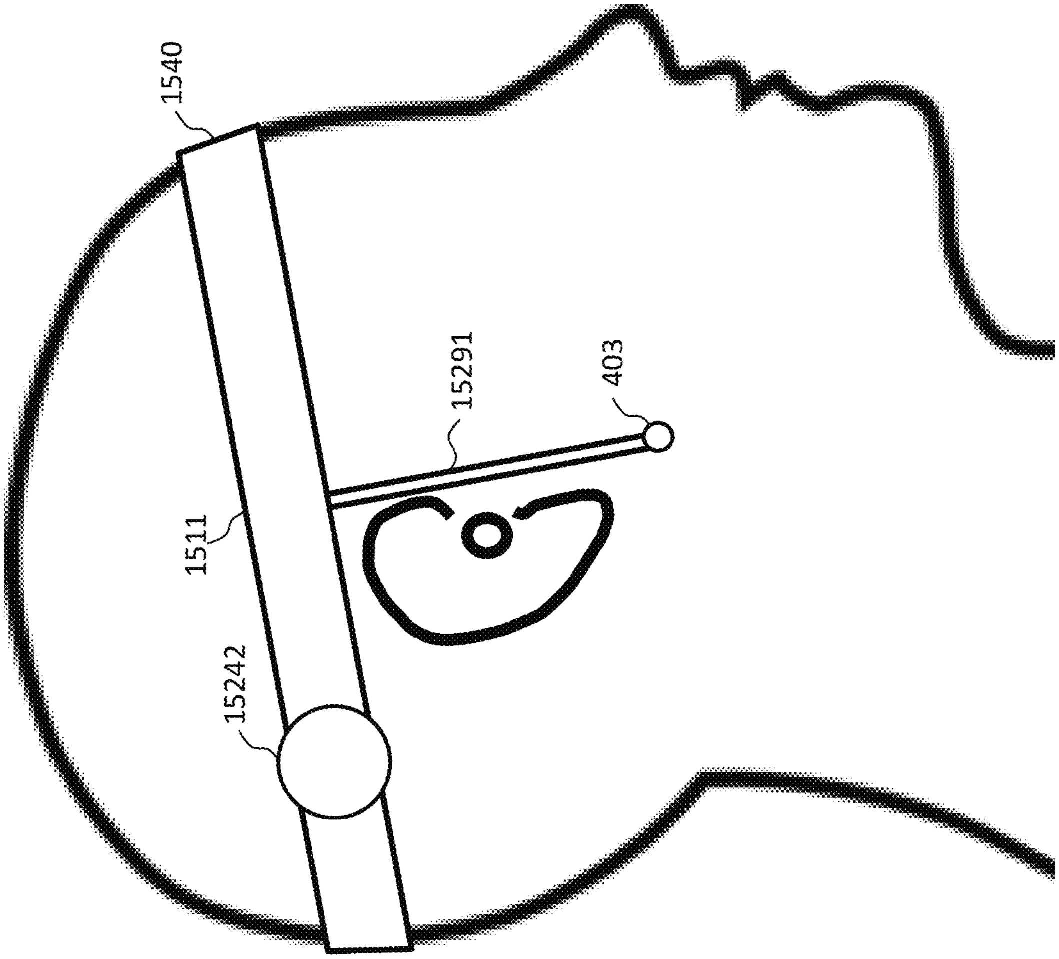
FIG. 15 is a side functional/conceptual view of an alternate embodiment of an external device not using a BTE device.

It is further noted that the teachings detailed herein are applicable to devices that do not interface with the pinna at all. In this regard, FIG. 15 depicts an exemplary embodiment of a passive transcutaneous bone conduction device 1540 held against the recipient via a so-called soft band configuration. More specifically, element 1511 is a flexible band that extends about the head of the recipient. Band 1511 holds button transducer 15242 against the head of the recipient as can be seen. Band 1511 also supports a subframe 15291 that supports microphone 43 in the second quadrant about the ear canal. It is noted that as is the case with all of these prostheses, the microphone 403 is in signal communication with a processing unit and/or a transducer that utilizes the output from the microphone to develop a transducer signal to evoke a hearing percept. In this regard it is further noted that element 15242 can also be a so-called button sound processor, where the output from microphone 403 is provided to a sound processor therein, where the sound processor processes the signals, and provides an output signal to a transducer to evoke a transcutaneous bone conduction hearing percept. Note further that in alternate embodiments of the embodiment of FIG. 15, this can be a middle ear implant or the like, where, for example, element 15242 is an RF inductance coil that is in signal communication with an implanted inductance coil. The implanted inductance coil in turn is in signal communication with an implanted actuator that evokes a hearing percept by imparting vibrational movement portions of the middle and/or inner ear. Note further that in alternate embodiments of the embodiment of FIG. 15, this can be a so-called active transcutaneous bone conduction device, where element 15242 is again an RF inductance coil, but is a coil that is in signal communication with an implanted inductance coil. The implanted inductance coil is in turn in signal communication with an implanted actuator that evokes a hearing percept by imparting vibrations into the mastoid bone/temporal bone, to evoke a hearing percept via bone conduction.

Figure 16:
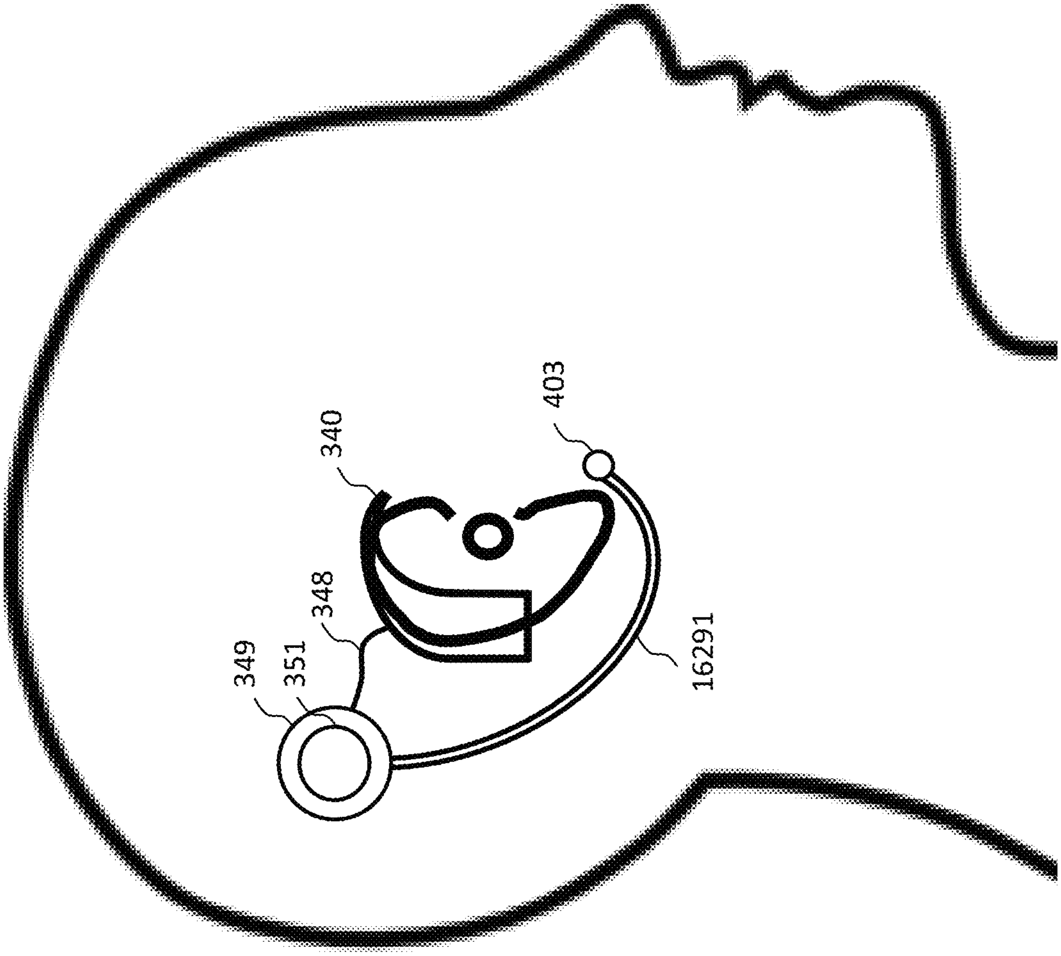
FIG. 16 is a side functional/conceptual view of an alternate embodiment of an external device that utilizes a BTE device.

Corollary to the embodiments associated with FIG. 15 is that in some alternate embodiments, the external component that is held against the mastoid bone is held via a magnetic link with a magnet implanted in the recipient. FIG. 16 depicts such an exemplary embodiment that utilizes the BTE device 340, where remote vibrator actuator unit 349 (which can be in the form of a button vibrator), is held against the skin of the recipient via a magnet 351. The remote vibrator actuator unit 349 is in signal communication with the spine of the BTE device via the cable 348 according to the teachings above. In this embodiment, a subframe 16291 extends from the remote vibrator actuation unit 349 around the pinna to support the microphone 403 in the second quadrant about the ear canal, as can be seen. It is noted that in an exemplary embodiment, the subframe 16291 is vibrationally isolated, or is otherwise comprised of material that sufficiently dampens vibrations resulting from the actuator 349 so that those vibrations do not cause feedback at the microphone 43, at least due to the transmission of those vibrations along the subframe 16291. As can be seen, the embodiment of FIG. 16 utilizes a subframe 16291 that is configured such that no part thereof is eclipsed by the pinna.

Figure 17:
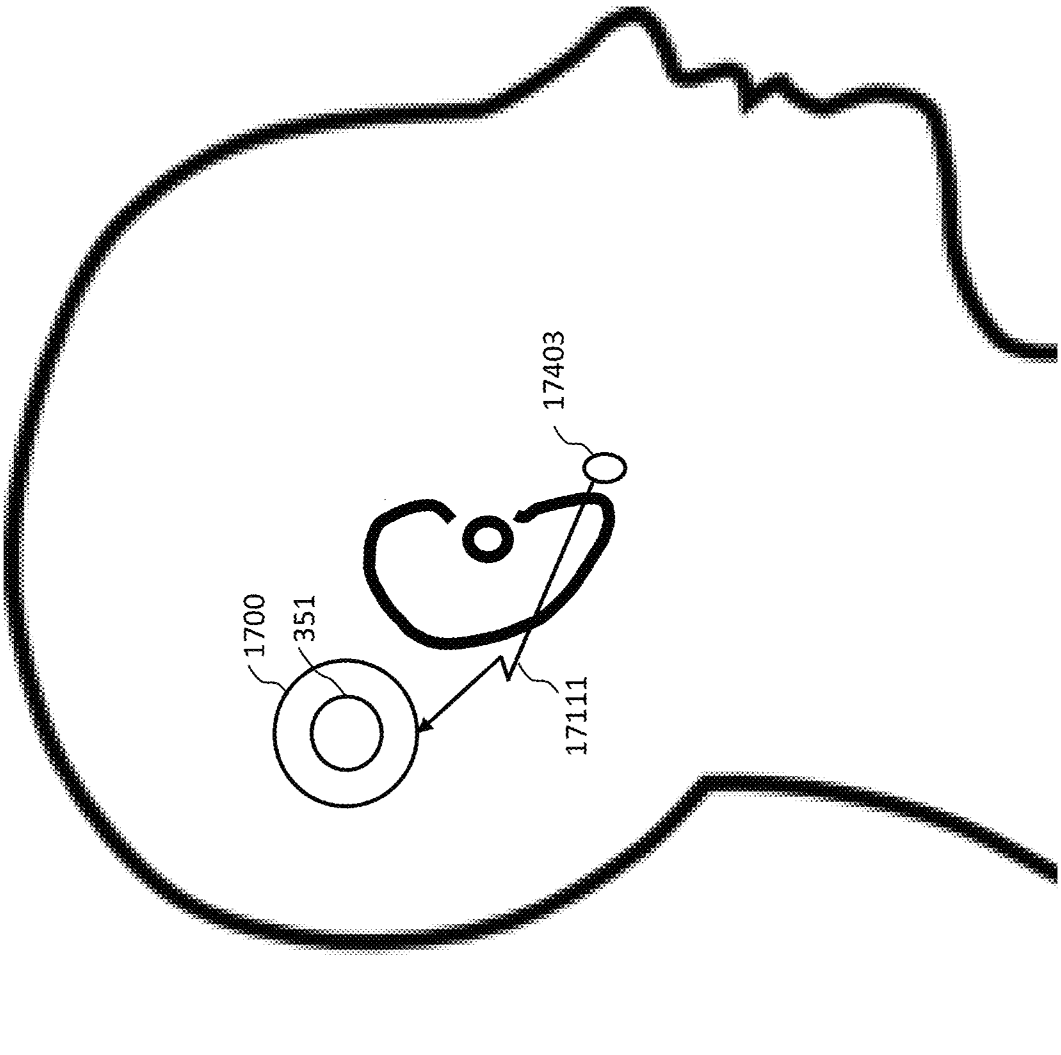
FIG. 17 is a side functional/conceptual view of an alternate embodiment of an external device not using a BTE device.

FIG. 17 depicts yet another alternate embodiment of an exemplary embodiment that utilizes, at least in part, some of the exemplary teachings detailed herein. In this regard, the embodiment of FIG. 17 includes a button sound processor 1700 that includes a vibrator actuator. The button sound processor 1700 is held against the skin of the recipient via a magnet 351. Here, the microphone 17403 is not physically connected to the actuator and/or the sound processor, etc., directly or indirectly. Instead, the microphone 17403 is in the form of a patch that is adhesively retained against the skin of the recipient, although other exemplary retention scenarios can be utilized to hold the microphone 17403 in place. The microphone 17403 communicates with the button sound processor 1700 via a RF link 17111. The output of the microphone 17403 is communicated to the button sound processor 1700 via the link. The button sound processor receives the signal via the link, and then utilizes that signal to evoke a hearing percept, such as, by way of example only and not by way of limitation, processing the signals and providing those processed signals to an actuator. That actuator could be located in or otherwise be a part of the button sound processor number 1700, in the case of a passive transcutaneous bone conduction device. Alternatively, and/or in addition to this, that actuator can be an implanted actuator, in the case of a middle ear implant and/or an inner ear implant, and the button sound processor could include an RF coil that is in inductance medication with an implanted RF coil as described above.

In view of the various embodiments detailed above, in an exemplary embodiment, there is a device, such as, for example and not by way of limitation, prosthesis 440, 940, 1140, 1540, etc. detailed above, that corresponds to a prosthesis configured with a sound capture system (e.g., microphone 403, etc.) and configured to evoke a hearing percept based on a captured sound captured by the sound capture system. In exemplary embodiments of these devices detailed above, at least a portion of the prosthesis is configured to attach to a head of a recipient such that sound is captured by the sound capture system externally of the recipient at a location below an ear canal of a human (e.g., such as at a head location on the human below the ear canal, at a location below the ear canal but above the shoulders of the human). In an exemplary embodiment, at least a portion of the prosthesis of which the sound capture system is a part is configured to attach to the head of the recipient such that sound is captured by the sound capture system externally of the recipient at a location below an ear canal of the human. In this regard, with respect to FIG. 7A, this would correspond to a microphone located below the line 97, which is parallel to line 98, and is tangent with respect to the lowest most surface of the ear canal 106. Consistent with the embodiments of FIGS. 4, 5A, 5B, 6, etc., in at least some embodiments of this exemplary device, the device is configured to be attached to the pinna 105 of the recipient/human. Conversely, consistent with the embodiment of FIG. 12A, the embodiment of FIG. 12B, the embodiment of FIG. 13 and the embodiment of FIG. 14, etc., the device is configured to interface with the pinna of the human (as contrasted to the device that attaches to the pinna 105 of the human).

That said, as will be understood in view of the embodiments of FIGS. 15 and 17, in some alternate embodiments of this device, the device is configured to be worn on the head of the recipient without interfacing with the pinna of the human.

Thus, with respect to FIG. 7A, the embodiments of the behind-the-ear (BTE) devices according to at least some exemplary embodiments include a sound capture device that is configured to capture the sound externally of the recipient located at a location below the ear canal of the human (i.e., below line 97) when the BTE device is attached to the head of the recipient and at least a portion thereof is located behind the pinna of the recipient. In a similar vein, in some exemplary embodiments, there is a behind the ear (BTE) device including a microphone, such as by way of example only and not by way limitation, that of BTE device 440, 940 and 1140 (but not exclusive thereto, as is the case with all exemplary embodiments referenced herein unless otherwise noted), where the BTE device is configured to be secured behind the pinna of a human. In these exemplary embodiments, the hearing prosthesis is configured such that the microphone is located at least one of (i) at a lower portion of the BTE device when the BTE device is secured behind the pinna or (ii) below the ear canal when the BTE device is secured behind the pinna, as is the case with all of the embodiments of 440, 940, and 1140. Note further that in at least some exemplary embodiments, the microphone is located at substantially the bottom, including the lowermost portion of the BTE device, when the BTE device is secured behind the pinna of the recipient and/or otherwise secured to the head of the recipient. Note that with respect to the embodiment of FIG. 9B, microphone 4402 is a microphone that is located at a lower portion of that BTE device. Still with reference that embodiment, microphone 202 is a microphone that is located at substantially the bottom of that BTE device. With respect to the embodiment of FIG. 11B, microphone 402 is located at the lowermost portion of the BTE device.

Figure 18:
FIG. 18 is flowchart for an exemplary method according to an exemplary embodiment.

FIG. 18 presents a flowchart for an exemplary method 1800 according to an exemplary embodiment. Method 1800 includes method action 1810, which entails capturing sound at an exterior location of a recipient (i.e., as opposed to using an implanted microphone and as opposed to a microphone located remotely from the recipient, which would not be a location of a recipient). Accordingly method action 1810, the action of capturing the sound, is executed at least one of at a lower pinna location of the recipient or outside an area over a mastoid bone of the recipient. With respect to the former location, this corresponds to a location that is below line 98, where for the purposes of this disclosure, the center of the ear canal 106 corresponds to the demarcation point of the upper pinna versus the lower pinna. (Corollary to this is that line 99 corresponds to a demarcation point corresponding to a forward portion of the pinna versus a rear portion of the pinna, this is distinguished from being in front of the pinna versus being in back of the pinna were being behind the pinna. Note further that in some exemplary methods, the action of capturing sound occurs at a location that is below line 96 with reference to FIG. 7A, where line 96 corresponds to the top tangential portion of the ear canal 106).

With respect to the latter location, the feature of an area over a mastoid bone of the recipient has been described above with respect to FIGS. 8A, 8B, and 8C.

Method 1800 further includes method action 1820, which entails evoking a hearing percept based on the captured sound at the given location. This can be done according to any of the techniques detailed herein, such as by way of example only and not by way limitation, bone conduction, middle ear stimulation, inner ear stimulation, stimulation of tissue utilizing a device located outside the recipient/outside the skin of the recipient, etc.

In an exemplary embodiment of method 1800, the recipient has a skull. In this exemplary embodiment, the action is capturing sound according to method action 1810 is executed using a sound capture device of the hearing prosthesis, such as by way of example, microphone. In this exemplary method, the skull vibration radiation that results from the activation of the hearing prosthesis to evoke a hearing percept that is captured by the sound capture device is lower than that which would be the case if the sound was instead captured at an upper pinna location of the recipient and/or at a location within an area above the mastoid bone of the recipient. In an exemplary embodiment, the skull vibration radiation captured by the sound capture device is lower than that which would be the case if the sound was instead captured at locations different than those detailed herein that have been disclosed, at least implicitly, as being locations where there is likely less feedback to occur relative to other locations/at the locations specifically detailed herein relative to the other locations. In an exemplary embodiment, this is the case with respect to locations on the right side of lines 99, 94, and/or 95 versus the left side of those lines (the "other locations"), locations below line 97, 98, and/or 96 versus above those lines (the "other locations"), locations in between the 2 o'clock position and the 8 o'clock position versus locations outside of those positions (the "other locations"), locations between the 3 o'clock position and the 7 o'clock position versus locations outside of those positions, locations between the 3 o'clock position and the 6 o'clock position versus locations outside of those positions locations between the 7 o'clock position and the 4 o'clock position versus locations outside of those positions, any location between the 2 o'clock position and the 10 o'clock position in increments of a half hour or any range of values therebetween in increments of a half hour versus locations between the 4 o'clock position and the 7 o'clock position exclusive of those positions that would fall within the former range in increments of the half-hour or any range thereof in increments of the half-hour, locations above the boundary 801 versus below the boundary 801, locations above the boundary 851 versus locations below the boundary 851, locations 804, 803, 805, 802, 868, 867, 865, and possibly 866 versus locations 815, 814, 813, 812, and possibly 866. In an exemplary embodiment, the former locations are the locations where there is less skull vibration radiation in the latter locations (the locations after the "vs.").

In an exemplary embodiment, the skull vibration radiation captured by the sound capture device in one or more or all of the pertinent locations is lower than that which would be the case if that sound capture device utilized to capture sound, all of the things being equal, in one or more or all of the other locations by an amount that is more than about 10% lower, more than 15% lower, more than 20% lower, more than 25% lower, more than 30% lower, more than 35% lower, more than 40% lower, more than 45% lower, more than 50% lower, more than 55% lower, more than 60% lower, more than 65% lower, more than 70% lower, more than 75% lower, more than 80% lower, more than 85% lower, or more.

In an exemplary embodiment, the skull vibration radiation captured by the sound capture device in one or more or all of the pertinent locations such that the input magnitude of the energy causing the radiation that is captured (if any is captured at all) is such that it can be increased by 5%, by 10%, by 15%, by 20%, by 25, 30%, by 35%, 40%, 45%, by 50%, by 55%, 60%, by 65%, by 70%, by 75%, by 80%, by 85%, by 90%, by 95%, by 100%, by hundred and 10%, by hundred and 20%, by hundred and 30%, by hundred and 40%, by hundred and 50%, by hundred and 60%, by hundred and 70%, by hundred and 80%, by hundred 90% and/or by 200% without causing feedback relative to the level that would cause feedback were the sound captured at the other locations all other things being equal.

It is further noted that in an exemplary embodiment of the method 1800, the sound is captured at a location that is located above a substantially soft-tissue location of the recipient. In an exemplary embodiment of method 1800, the hearing percept is developed by a bone conduction vibrator that is located at and/or above a substantially hard tissue location of the recipient. Herein, a substantially soft-tissue location of the recipient corresponds to a location where there is little to no hard tissue, such as bone, below the location. In an exemplary embodiment, the locations below order 850 correspond to such. Herein, a substantially hard tissue location of the recipient corresponds to a location where there is hard tissue, such as bone. With respect to a location above a substantially hard tissue location, this can correspond to the locations above, for example, the mastoid bone, where there is relatively thin amount of soft-tissue above that bone, even though there is indeed soft-tissue between the location and the bone.

To be clear, exemplary embodiments can also include embodiments where the microphone is located over one or more of the aforementioned bones that have been heretofore described as "exclusionary zones" providing that there is a certain amount of soft-tissue located over that bone and the microphone. By way of example only and not by way of limitation, the skin over the styloid process, at least at some locations thereof, can meet such an embodiment.

In an exemplary embodiment, a location that can have utilitarian value with respect to placement of the microphone to achieve, at least partially, some of the utilitarian values detailed herein, can correspond to a location where there is only soft-tissue to a depth beneath the location on the surface of the skin for more than 7 mm, more than 8 mm, more than 9 mm, more than 10 mm, more than 11 mm, more than 12 mm, more than 13 mm, more than 14 mm, more than 15 mm, more than 16 mm, more than 17 mm, more than 18 mm, more than 19 mm, more than 20 mm, more than 22 mm, more than 24 mm, more than 26 mm, more than 28 mm, or more than 30 mm, or more.

In an exemplary embodiment, method 1800 is executed such that a hearing percept is evoked via a bone conduction vibrator that outputs most of its vibrational energy into a skull of the recipient at a first location, and the sound is captured at a second location that is within or outside of 1 inch, 1.5 inches, 2 inches, 2.5 inches, 3 inches, 3.5 inches, 4 inches, 4.5 inches, or 5 inches or 5.5 inches of the first location. Again, in an exemplary embodiment, the second location is at a substantially soft tissue location of the recipient. In at least some exemplary embodiments, the distance from the actuator/vibrator and/or the location where the vibrator outputs most of its vibrational energy can attenuate the feedback, at least in some instances. Thus, in an exemplary embodiment, there can be utilitarian value with respect to increasing the distance between the vibrator and the microphone. In this regard, some of the embodiments detailed herein, such as that which results from the microphone being located according to, for example, the microphone 403 of FIG. 5B, can have utilitarian value with respect to the synergistic effects of relying on the attenuation of distance, the attenuation of soft-tissue underlying the location of the microphone, and the fact that the mastoid bone, the temporal bones, or even all bones are located away from the location of the microphone (again, where location corresponds to what is beneath/directly beneath the microphone).

Figure 19:
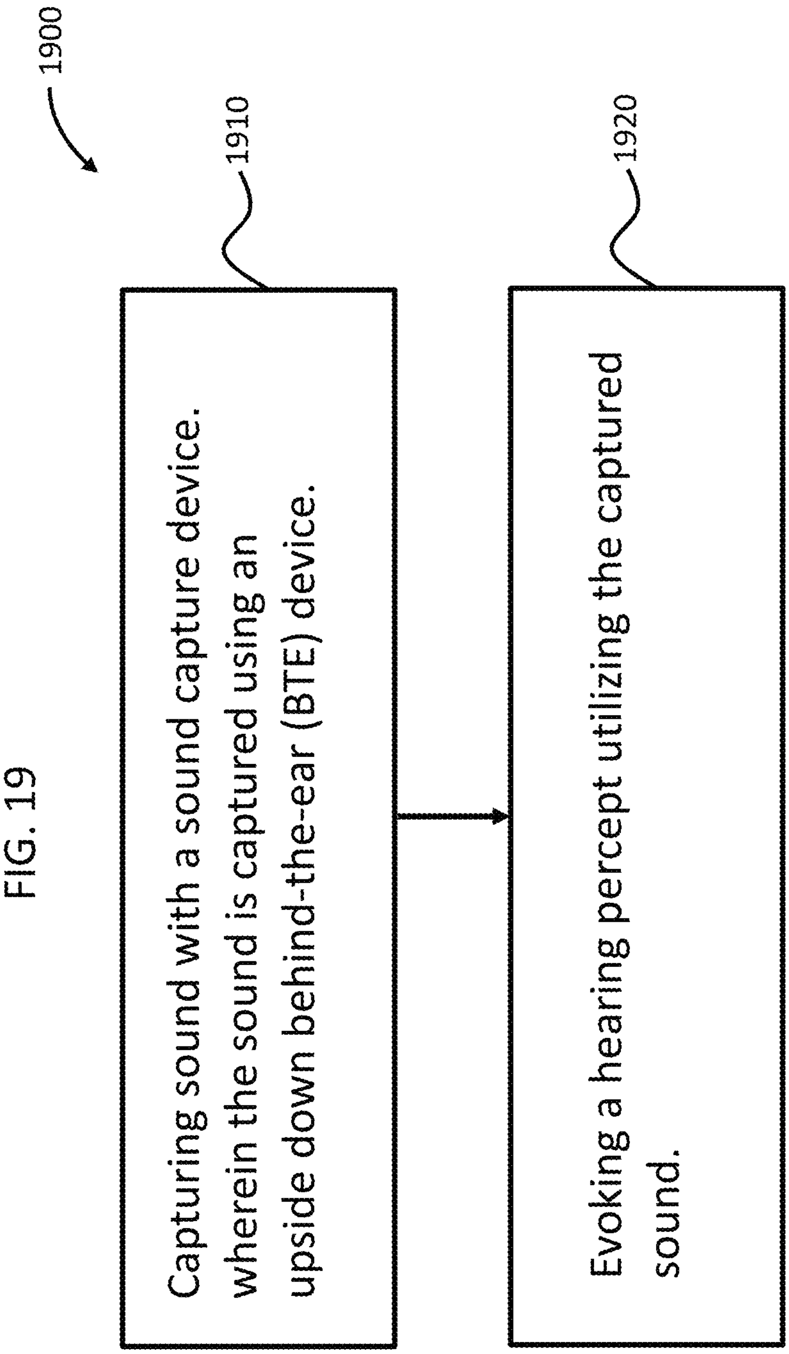
FIG. 19 is flowchart for another exemplary method according to an exemplary embodiment.
Figure 20:
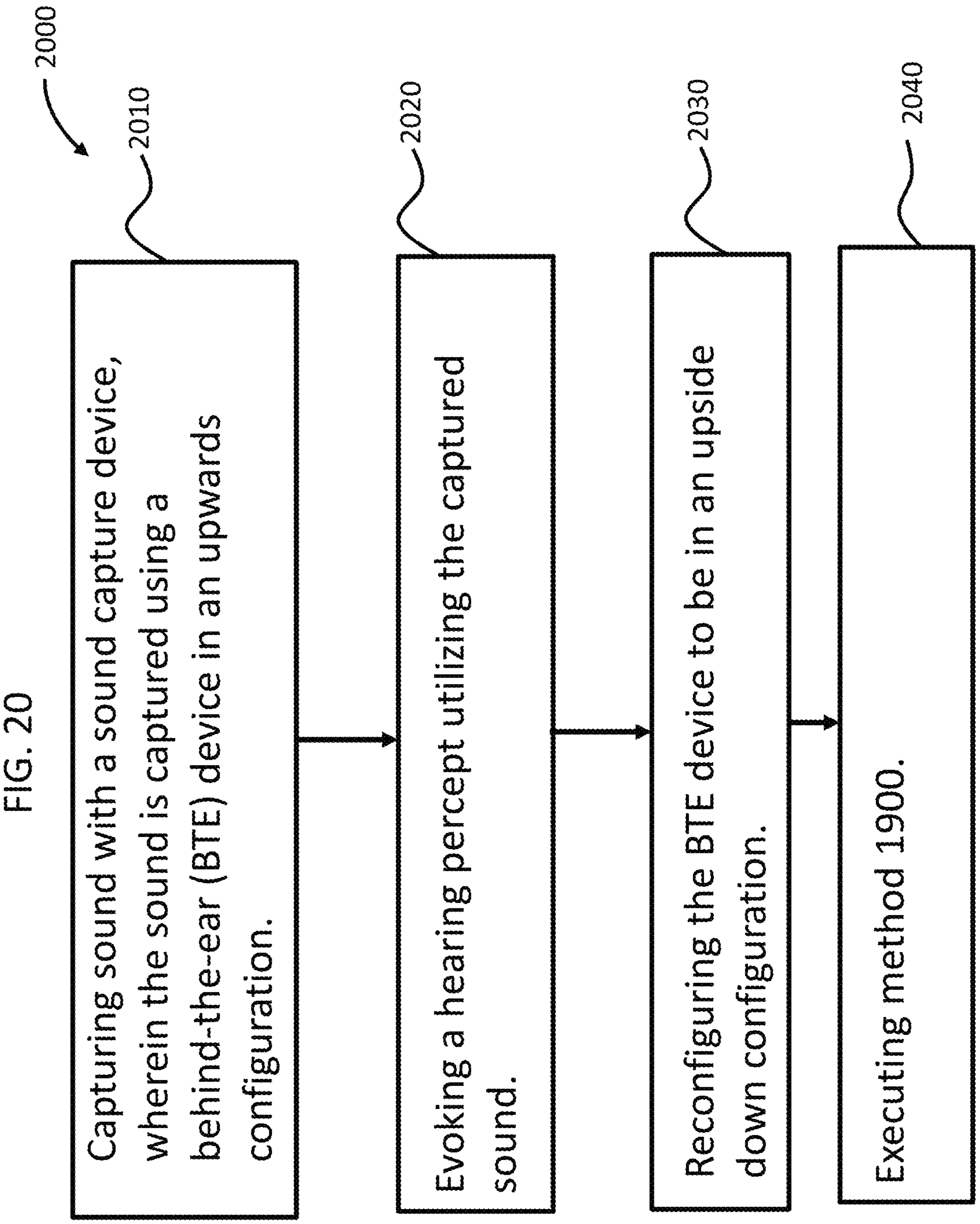
FIG. 20 is flowchart for another exemplary method according to an exemplary embodiment.

FIG. 19 depicts a flowchart for another exemplary method, method 1900. Method 1900 includes method action 1910, which entails capturing sound with a sound capture device. In an exemplary embodiment, the sound capture device is a microphone according to the teachings detailed herein and/or variations thereof. Method 1900 further includes method action 1920, which entails evoking a hearing percept utilizing the captured sound. In an exemplary embodiment, method action 1910 is executed such that the sound is captured utilizing an upside down behind the ear device. In an exemplary embodiment, the upside down behind the ear device corresponds to a normal BTE device that has been reconfigured for usage in an upside down configuration. In an alternate of an embodiment, the upside down behind the ear device corresponds to a BTE device that is specifically designed that way and otherwise manufacture that way during the production process. Still further, though with respect to the former, in an exemplary embodiment, there is an exemplary method 2000, as is detailed in FIG. 20. Method action 2010 of method 2000 entails capturing sound with the sound capture device, wherein the sound is captured utilizing a behind the ear device in upwards configuration (i.e., according to FIGS. 2A and 3B). Method 2000 further includes method action 2020, which entails evoking a hearing percept using the captured sound. Subsequently, method 2000 further includes method action 2030, which entails reconfiguring the BTE device to be in an upside down configuration. In an exemplary embodiment, this is executed utilizing a kit that enables a second ear hook to be applied to the bottom or otherwise to a side of the BTE device so that the BTE device can be inverted and utilized in an upside down configuration. That said, in some alternate embodiments, method action 2030 is not needed to be executed. In this regard, the BTE device can be a dual-mode BTE device which can be utilized in an upright configuration and in an inverted configuration by simply flipping the BTE device over. That is, the BTE device can include 2 ear hooks. Note further that in an exemplary embodiment, a variation of method 2000 entails, instead of reconfiguring the BTE device to be in an upside down configuration, attaching a microphone to the BTE device such that the microphones located according to the locations detailed herein having utilitarian value. Instead of executing method 1900 at method action 2040, sound is captured with the BTE device in the upwards configuration, but with this new microphone, and then based on this sound capture, a hearing percept is evoked.

In view of the above, with respect to the embodiments that correspond to a modified or otherwise upside down BTE based on the embodiment of FIG. 2A, it will be understood that in an exemplary embodiment, the BTE device includes a vibrator located in a housing assembly of the BTE device (e.g., the housing of the spine). In this exemplary embodiment, the sound is captured with a sound capture device that is supported by the housing assembly of the BTE device. It is noted that the housing assembly can include both a single housing, and a housing that is attached thereto, such as by way of example only and not by way of limitation, the ear hook that is attached to the spine housing.

Figure 21:
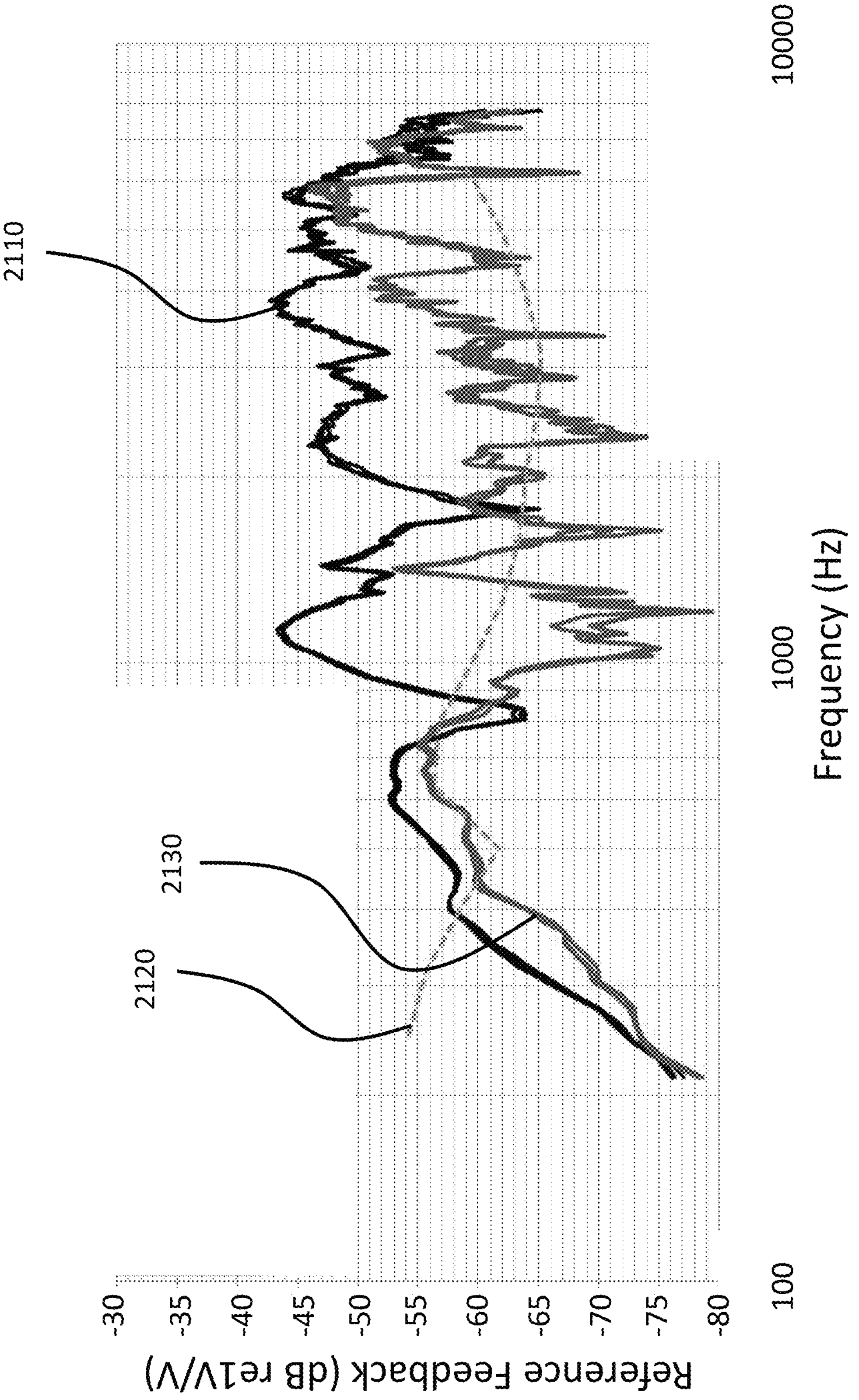
FIG. 21 presents a graph of exemplary data associated with the implementation of some exemplary embodiments.

FIG. 21 depicts exemplary data associated with some exemplary embodiments, along with some exemplary data comparing other embodiments. FIG. 21 depicts a graph that includes a plot 2110, depicting reference feedback for a device that utilizes a microphone above the hard tissue locations/does not implement microphone placement according to the utilitarian teachings herein. FIG. 21 further depicts a graph that includes a plot 2120, depicting reference feedback for a device that utilizes a microphone located above substantially soft tissue locations/that does implement microphone placement according to the utilitarian teachings detailed herein. Plot 2130 indicates an exemplary baseline hearing loss for an exemplary recipient, as can be seen, the greater the hearing loss, the greater the increase, at least generally, in the utilitarian value of at least some exemplary embodiments.

In an exemplary embodiment, the methods detailed herein and/or variations thereof result in, and devices detailed herein and/or variations thereof are configured, such that the evocation of the hearing percept is executed with at least about a 10 dB more gain relative to that which would be the case with a microphone located at the other locations detailed herein, without causing feedback, or at least feedback that has a significantly deleterious effect, all other things being equal. In an exemplary embodiment, the methods detailed herein and/or variations thereof, and the devices detailed herein and/or variations thereof, executed in the embodiment of a BTE, result in the evocation of a hearing percept with at least about 10 dB more gain relative to that which would be the case with a right side up BTE, all other things being equal, without causing feedback, or at least feedback that has a significantly deleterious effect. In an exemplary embodiment, the hearing percept is executed with at least about 5, 6, 7, 8, 9, 10, 11, 12, 13, 14, 15, 16, 17, 18, 19, or 20 dB or more gain, or any value or range of values therebetween in 0.1 dB increments, relative to that which would be the case with a microphone located at the other locations detailed herein and/or located above non-substantially soft tissue locations and/or located within the exemplary radii about the actuator detailed herein without causing feedback, or at least feedback that has a significantly deleterious effect, all other things being equal.

It is noted that the aforementioned gain values can be frequency specific, as will be understood from FIG. 21. In an exemplary embodiment, the higher gains correspond to higher frequencies (e.g., 8 kHz), although in at least some embodiments, lower frequencies can achieve such higher gains as well.

It is briefly noted that some of the embodiments detailed herein can have utilitarian value with respect to managing wind noise and/or with respect to implementing directionality functions. In this regard, any of the methods detailed herein include method actions that entail evoking a hearing percept while managing wind noise relative to that which was the case in a prior evoked hearing percept (where there was wind noise in some instances, and where there was no wind noise in other instances). Still further, this corresponds to a device configured to do such. Still further in this regard, any of the methods detailed herein include method actions that entail evoking a hearing percept while implementing a directionality function, such as a beamforming function, relative to that which was the case in a prior evoked hearing percept (where there was directionality/beamforming in some instances, and where there was no directionality/beamforming in other instances). To be clear, in an exemplary embodiment, at least with respect to embodiments that utilize a microphone at the bottom of the BTE device along with a microphone at the top of the BTE device, such microphones can be utilized for directionality implementations and/or beamforming implementations. Accordingly, in an exemplary embodiment, there is a BTE device that has two microphones, one located at about the bottom of the BTE device and one located at about the top of the BTE device, wherein the BTE device is configured to utilize those two microphones for beamforming/directionality functions. Note further that in at least some exemplary embodiments, a third microphone can be located on the BTE device. Note also that in at least some exemplary embodiments, one or more microphones can be located on the BTE device/the body of the BTE device and one or more of the microphones can be located on the button portion or at a third location. Such embodiments can also utilize these microphones four beamforming/directionality functions.

It is noted that any method disclosed herein corresponds to a disclosure of an apparatus and/or a system configured to execute that method and/or an apparatus and/or a system having the functionality of that method. Further, any method disclosed herein of manufacturing or otherwise establishing a device and/or system corresponds to a disclosure of a device and/or system manufactured by that method. Further, any device and/or system disclosed herein corresponds to a disclosure of a method of utilizing that device and/or system according to the functionality thereof. Any embodiment disclosed herein and/or any feature of any embodiment disclosed herein can be combined with one or more or all of the other features and/or other embodiments disclosed herein.

With respect to some of the exemplary methods detailed above, such as those corresponding to flipping a BTE device upside down with respect to how the BTE device was previously worn by the recipient, an exemplary method entails doing so prior to a recipient placing a hat and/or a pair of glasses on him or her. Corollary to this is that in an exemplary embodiment, upon or otherwise subsequent removal of the hat and/or glasses, the recipient changes the BTE device to a right side up configuration.

Note further that in at least some exemplary embodiments, placing the microphone at the aforementioned locations can have utilitarian value with respect to scenarios where the origination of sound occurs below the eye line of the recipient (or ear line of the recipient). By way of example only and not by way of limitation, such wearing configurations and/or such structural configurations can have utilitarian value with respect to people who have small children, people who work at heights, such as by way of example only and not by way of limitation, painters or carpenters who work on ladders, or construction workers who work on framed buildings at height. In this regard, at least some exemplary embodiments improve directionality in the vertical plane relative to that which would otherwise be the case for a traditional BTE device, all other things being equal. Accordingly, in an exemplary embodiment, there are one or more of the method actions detailed herein that are combined with the action of a recipient working at the aforementioned heights. In an exemplary embodiment, there is a method that entails utilizing the BTE device in a traditional manner, and then flipping the BTE device upside down and then subsequently and/or prior to this, changing a height location of the recipient (note that this can also be done while changing the height location of the recipient) and then evoking a hearing percept at that height location, and then flipping the BTE device such that it is in the traditional manner again, and then subsequently and/or prior to this, changing a height location of the recipient to a normal and/or traditional height location, such as that corresponding to the recipient having both feet on the ground, and then evoking a hearing percept utilizing the BTE device in the traditional configuration at that new height level. Corollary to this is that in an exemplary method, the recipient utilizes the BTE device to evoke a hearing percept while the BTE device is in the normal configuration, and has conversations with adults, the recipient then subsequently flips the BTE device upside down, and then has conversations with children or other entities who are substantially shorter than the recipient, wherein a hearing percept is evoked based on sounds from those children with the BTE device in the upside down position.

In an exemplary embodiment, there is a hearing prosthesis, comprising a behind the ear (BTE) device including a microphone, wherein the BTE device is configured to be secured behind the pinna of a human, and the hearing prosthesis is configured such that the microphone is located at least one of: at a lower portion of the BTE device when the BTE device is secured behind the pinna; or below the ear canal when the BTE device is secured behind the pinna.

In an exemplary embodiment, there is a hearing prosthesis as detailed above, wherein the hearing prosthesis is configured such that, in use, when the BTE device is worn behind the pinna, the microphone is located outside a boundary that is overlying the temporal bone of the recipient.

While various embodiments of the present invention have been described above, it should be understood that they have been presented by way of example only, and not limitation. It will be apparent to persons skilled in the relevant art that various changes in form and detail can be made therein without departing from the spirit and scope of the invention. For instance, in alternative embodiments, the BTE is combined with a bone conduction In-The-Ear device. Thus, the breadth and scope of the present invention should not be limited by any of the above-described exemplary embodiments, but should be defined only in accordance with the following claims and their equivalents.

What is claimed is:

1. A device, comprising:
- a body worn sound apparatus configured with a sound capture system and configured to evoke a hearing percept based on a captured sound captured by the sound capture system, wherein
- at least a portion of the apparatus is configured to attach to a head of a recipient such that sound is captured by the sound capture system externally of the recipient at a head location below and in front of a rearmost portion of an ear canal of a human,
- the body worn sound apparatus includes a vibrator,
- the vibrator generates energy to evoke the hearing percept,
- the sound capture system includes a microphone that captures the sound at the head location, the microphone being lower with respect to a height direction of the human than a center of gravity of the vibrator when the device is worn by the human, and
- the microphone and the vibrator are part of a main body of the hearing apparatus.

2. The device of claim 1, wherein:
- the device is configured to be attached to the pinna of the human.

3. The device of claim 1, wherein:
- the body worn sound apparatus is a bone conduction prosthesis; and
- the at least the portion of the prosthesis is configured to attach to the head of the recipient such that the sound is captured by the sound capture system externally of the recipient at the head location in front of an ear canal of a human.

4. The device of claim 3, wherein:
- the device is configured to interface with the pinna of the human.

5. The device of claim 1, wherein:
- the device is configured such that the sound is captured at a location just beneath the mastoid bone.

6. The device of claim 3, wherein:
- the apparatus includes a behind-the-ear (BTE) device including a sound capture device that is configured to capture the sound externally of the recipient located at the location below the ear canal of the recipient when the BTE device is attached to the head of the recipient and at least a portion thereof is located behind a pinna of the recipient.

7. The device of claim 1, wherein:
- the apparatus is configured such that the sound is captured at a location that is not above skull bone when the apparatus is secured behind a pinna of the recipient.

8. The device of claim 6, wherein:
- the apparatus is configured such that the sound is captured at a location away from the fixed large bones of the skull when the BTE device is secured behind the pinna.

9. The device of claim 1, wherein:
- the device is configured such that the sound is captured at a location that is in the second quadrant about the ear canal.

10. A hearing apparatus, comprising:
- a behind the ear (BTE) device including a microphone, wherein
- the BTE device is configured to be secured behind the pinna of a human,
- the hearing apparatus is configured such that the microphone is located at least approximately over the styloid process of the human when the BTE device is secured behind the pinna, and
- the hearing apparatus is configured such that the microphone is located at least one of:
  - (i) at a lower portion of the BTE device when the BTE device is secured behind the pinna; or
  - (ii) below the ear canal when the BTE device is secured behind the pinna.

11. The hearing apparatus of claim 10, wherein:
- the hearing apparatus is configured such that the microphone is located at substantially the bottom of the hearing apparatus when the BTE device is secured behind the pinna.

12. The device of claim 1, wherein:
- the device is configured such that the microphone is located at least approximately over the styloid process of the human when the device is secured behind a pinna of the human.

13. The hearing apparatus of claim 10, wherein:
- the hearing apparatus is configured such that, in use, when the BTE device is worn behind the pinna, the microphone is located outside a boundary that is overlying the mastoid bone of the human.

14. A method, comprising:

capturing sound at an exterior location of a recipient of a hearing device at a location corresponding to at least one of:

a lower pinna location of the recipient; or outside an area over a mastoid bone of the recipient; and evoking a hearing percept based on the captured sound, wherein the device includes a vibrator, the vibrator generates energy to evoke the hearing percept, the sound is captured using a microphone that captures the sound at a head location of the recipient, the microphone being lower with respect to a height direction of the recipient than a center of gravity of the vibrator when the device is worn by the recipient, and the microphone and the vibrator are part of a main body of the device.

15. The method of claim 14, wherein:

the action of capturing sound at the exterior location of the recipient is at the lower pinna location of the recipient.

16. The device of claim 1, wherein:

the body worn sound apparatus is a conventional hearing aid system.

17. The device of claim 1, wherein:

the body worn sound apparatus is configured to evoke the hearing percept using acoustic stimulation.

18. The device of claim 1, wherein:

the body worn sound apparatus is configured such that the sound is captured at a location away from fixed large bones of a skull of the recipient when the apparatus is secured behind a pinna of the recipient and attached to the pinna.

19. The device of, claim 10, wherein:

the BTE device includes a vibrator;

the vibrator generates energy to evoke the hearing percept;

the microphone is lower with respect to a height direction of the human than a center of gravity of the vibrator when the device is worn by the human; and the microphone and the vibrator are part of a main body of the BTE device.

20. The device of claim 1, wherein:

the microphone is supported by a component of the device that juts out completely in front of and away from a lower portion of a pinna of the human when the portion of the apparatus is attached to the recipient.

21. The device of claim 1, wherein:

the microphone is supported by a component of the device that extends about a pinna of the human at a location away from a front of an earlobe of the pinna and that does not cross over the front of the earlobe when viewed head on or from a side of the human.

22. The hearing apparatus of claim 10, wherein:

the hearing apparatus is configured to evoke a hearing percept in the human based on sound captured by the microphone.

23. The hearing apparatus of claim 10, wherein:

the hearing apparatus includes a vibrating actuator located in totality away from a pinna of the human when the BTE device is secured behind the pinna of the human when viewed from a side of the human on which the BTE device is secured.

24. The hearing apparatus of claim 13, wherein;

the hearing apparatus is further configured such that, in use, when the BTE device is worn behind the pinna, another microphone is located inside a boundary that is overlying the mastoid bone of the human.

25. The hearing apparatus of claim 10, wherein:

the hearing apparatus is a passive transcutaneous bone conduction device.

26. The hearing apparatus of claim 10, wherein:

the hearing apparatus is an active transcutaneous bone conduction device.

27. The hearing apparatus of claim 10, wherein:

the hearing apparatus is configured to evoke a hearing percept using an acoustic signal.

28. The method of claim 19, wherein:

the hearing device is an upside down behind-the-ear (BTE) device; and the sound is captured with the hearing device.

29. The method of claim 14, wherein:

the vibrator outputs most of its vibrational energy into a skull of the recipient; and the sound is captured at a location that is within 4 inches of the first location, the second location being at a substantially soft tissue location of the recipient.

30. The method of claim 14, wherein:

the method results in the evocation of the hearing percept with at least about 5 dB more gain relative to that which would be the case with a right side up BTE device, without causing deleterious feedback, all other things being equal.

31. The method of claim 14, wherein:

the vibrator is located at and/or above a substantially hard tissue location of the recipient; and the sound is captured at a location that is located above a substantially soft tissue location of the recipient.

32. The method of claim 14, wherein:

the method results in the evocation of the hearing percept with more gain relative to that which would be the case if the sound was captured at an upper pinna location of the recipient and an area over the mastoid bone of the recipient, without causing deleterious feedback, all other things being equal.

33. The device of claim 6, wherein:

the device is configured to evoke the hearing percept without implanted components implanted in the recipient.

* * * * *